(12) United States Patent
Akiyama et al.

(10) Patent No.: US 10,474,023 B2
(45) Date of Patent: Nov. 12, 2019

(54) LIGHT SOURCE APPARATUS, ILLUMINATOR, AND PROJECTOR

(71) Applicant: SEIKO EPSON CORPORATION, Tokyo (JP)

(72) Inventors: Koichi Akiyama, Matsumoto (JP); Takayuki Matsubara, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 24 days.

(21) Appl. No.: 15/558,163

(22) PCT Filed: Mar. 3, 2016

(86) PCT No.: PCT/JP2016/001179
§ 371 (c)(1),
(2) Date: Sep. 13, 2017

(87) PCT Pub. No.: WO2016/157726
PCT Pub. Date: Oct. 6, 2016

(65) Prior Publication Data
US 2018/0074392 A1 Mar. 15, 2018

(30) Foreign Application Priority Data
Mar. 27, 2015 (JP) .................. 2015-067099

(51) Int. Cl.
*G03B 21/20* (2006.01)
*G02B 27/09* (2006.01)

(52) U.S. Cl.
CPC ....... *G03B 21/208* (2013.01); *G02B 27/0905* (2013.01); *G03B 21/2013* (2013.01); *G03B 21/2066* (2013.01)

(58) Field of Classification Search
CPC .............. G03B 21/208; G03B 21/2013; G03B 21/2066; G03B 21/2033; H04N 9/3152;
(Continued)

(56) References Cited

U.S. PATENT DOCUMENTS

2003/0090632 A1* 5/2003 Kim .................. G02B 27/0905
353/31
2004/0252388 A1* 12/2004 Yamanaka ......... G02B 27/0905
359/834
(Continued)

FOREIGN PATENT DOCUMENTS

JP 2011-013317 A 1/2011
JP 2013-190674 A 9/2013

OTHER PUBLICATIONS

May 31, 2016 International Search Report issued in International Patent Application No. PCT/JP2016/001179.

*Primary Examiner* — Christina A Riddle
*Assistant Examiner* — Christopher A Lamb, II
(74) *Attorney, Agent, or Firm* — Oliff PLC

(57) ABSTRACT

A light source apparatus, an illuminator, and a projector that output a reduced light beam flux in a direction roughly the same as the direction of the optical axis of an incident light beam flux. The light source apparatus includes a light source unit that outputs a light beam flux and a reduction system that includes a plurality of optical elements and reduces the cross section of the light beam flux. The optical elements each have first and second surfaces and first and second reflection surfaces and allow a corresponding light beam of the light beam flux to pass through the first surface, to be incident on the first reflection surface, to be sequentially reflected off the first reflection surface and the second reflection surface, and then to exit through the second surface to shift the optical path of the light beam in a first direction.

23 Claims, 12 Drawing Sheets

(58) Field of Classification Search
CPC .... H04N 9/3161; H04N 9/3164; G02B 5/045; G02B 27/0905; G02B 27/0994; G02B 6/4214
See application file for complete search history.

(56) References Cited

U.S. PATENT DOCUMENTS

| | | | |
|---|---|---|---|
| 2004/0252744 | A1 | 12/2004 | Anikitchev et al. |
| 2007/0291813 | A1* | 12/2007 | Hu .................... G02B 27/0905 372/107 |
| 2008/0239526 | A1* | 10/2008 | Takeda .................... G02B 6/00 359/833 |
| 2010/0328633 | A1 | 12/2010 | Sato et al. |
| 2017/0168381 | A1* | 6/2017 | Akiyama ........... G02B 27/0966 |

* cited by examiner

LIGHT SOURCE APPARATUS, ILLUMINATOR, AND PROJECTOR

TECHNICAL FIELD

The present invention relates to a light source apparatus, an illuminator, and a projector.

BACKGROUND ART

In recent years, as an illuminator for a projector, there is an illuminator that irradiates a phosphor layer with excitation light from a plurality of light sources to produce fluorescence used as image light (see PTL 1, for example).

CITATION LIST

Patent Literature

PTL 1: JP-A-2011-13317

SUMMARY OF INVENTION

Technical Problem

The light source unit in the related art described above, however, does not allow the excitation light reduced in size by a group of reflection mirrors to exit in the same direction as the direction of the optical axis of the group of light sources. To allow the excitation light reduced in size to exit in the same direction as the direction of the optical axis of the group of light sources, another optical system needs to be added.

The invention has been made to solve the problem described above, and an object of the invention is to provide a light source apparatus that outputs a reduced light beam flux in a direction roughly the same as the direction of the optical axis of an incident light beam flux. Another object of the invention is to provide an illuminator including the light source apparatus. Still another object of the invention is to provide a projector including the illuminator.

Solution to Problem

A first aspect of the invention relates to a light source apparatus including a light source unit that outputs a light beam flux formed of a plurality of light beams and a reduction system that includes P optical elements including a first optical element and a second optical element and reduces a cross section of the light beam flux in a first direction. The P optical elements each have a first surface having optical transparency, a second surface that faces the first surface and has optical transparency, a first reflection surface that is provided at a first end and inclines with respect to a normal to the first surface, and a second reflection surface that is provided at a second end that faces the first end and inclines with respect to a normal to the second surface. The P optical elements each allow a corresponding light beam of the light beam flux to pass through the first surface, to be incident on the first reflection surface, to be sequentially reflected off the first reflection surface and the second reflection surface, and to further exit through the second surface to shift an optical path of the light beam in the first direction. The light beam flux enters the reduction system along a second direction that intersects the first direction. The first optical element and the second optical element are sequentially provided in the second direction. The first reflection surface of the second optical element is shifted from the first reflection surface of the first optical element in a direction opposite the first direction, or the second reflection surface of the second optical element is shifted from the second reflection surface of the first optical element in the direction opposite the first direction.

In the light source apparatus according to the first aspect, the reduction system can reduce the light beam flux in the first direction, and the light beam flux is allowed to exit in roughly the same direction as the direction in which the light beam flux enters the reduction system. Further, optical loss that occurs when a light beam passes through an optical element that does not correspond to the light beam can be reduced in the reduction system as a whole.

In the first aspect described above, it is preferable that the P optical elements are sequentially provided in the second direction, and that when R is an arbitrary integer greater than or equal to 2 but smaller than or equal to P, the first reflection surface of an R-th of the optical elements is shifted from the first reflection surface of an (R−1)-th of the optical elements in the direction opposite the first direction, and the second reflection surface of the R-th optical element is shifted from the second reflection surface of the (R−1)-th optical element in the direction opposite the first direction.

According to the configuration described above, the number of locations where a light beam passes an optical element that does not correspond to the light beam can be further reduced in the reduction system as a whole. The amount of loss of the light beam flux can therefore be further reduced, whereby the light use efficiency can be improved.

In the first aspect described above, it is preferable that the light source apparatus further includes a second light source unit that outputs a second light beam flux formed of a plurality of light beams and a second reduction system that includes Q third optical elements and reduces a cross section of the second light beam flux in a third direction opposite the first direction, that the Q third optical elements each have a third surface having optical transparency, a fourth surface that faces the third surface and has optical transparency, a third reflection surface that is provided at a third end and inclines with respect to a normal to the third surface, and a fourth reflection surface that is provided at a fourth end that faces the third end and inclines with respect to a normal to the fourth surface, that the Q optical elements each allow a corresponding light beam of the second light beam flux to pass through the third surface, to be incident on the third reflection surface, to be sequentially reflected off the third reflection surface and the fourth reflection surface, and to further exit through the fourth surface to shift an optical path of the light beam in the third direction, that the second light beam flux enters the second reduction system along the second direction, that the Q third optical elements are sequentially provided in the second direction, and that when S is an arbitrary integer greater than or equal to 2 but smaller than or equal to Q, the third reflection surface of an S-th of the third optical elements is shifted from the third reflection surface of an (S−1)-th of the third optical elements in the first direction, and the fourth reflection surface of the S-th third optical element is shifted from the fourth reflection surface of the (S−1)-th second optical element in the first direction.

According to the configuration described above, the number of locations where a light beam passes an optical element that does not correspond to the light beam can be further reduced in the reduction system as a whole. The amount of loss of the light beams can therefore be reduced, whereby the light use efficiency can be maximized.

In the first aspect described above, at least one of the first optical element and the second optical element is preferably formed of a prism.

According to the configuration described above, the parallelism between the first reflection surface and the second reflection surface of the prism is determined by the processing precision in the manufacture of the prism, whereby the reduction system does not need to be implemented with high precision.

In the first aspect described above, it is preferable that the light source apparatus further includes a third reduction system that further includes a fourth optical element and reduces the cross section of the light beam flux in a fourth direction that intersects the first direction but differs from the second direction, that the fourth optical element has a fifth surface having optical transparency, a sixth surface that faces the fifth surface and has optical transparency, a fifth reflection surface that is provided at a first end and inclines with respect to a normal to the fifth surface, and a sixth reflection surface that is provided at a second end that faces the first end and inclines with respect to a normal to the sixth surface, that the fourth optical element allows a corresponding light beam of the light beam flux to pass through the fifth surface, to be incident on the fifth reflection surface, to be sequentially reflected off the fifth reflection surface and the sixth reflection surface, and to further exit through the sixth surface to shift an optical path of the light beam in the fourth direction, that the first direction coincides with a direction of a major axis of a cross section of the light beam, and that the third reduction system is disposed in a position downstream of the reduction system.

For example, light emitted from a semiconductor laser has an elliptical cross-sectional shape. In a case where the light beam flux is reduced in the direction of the major axis of the ellipse, the light beam flux is more greatly affected by variation in implementation of the semiconductor laser than in a case where the light beam flux is reduced in the direction of the minor axis of the ellipse. Further, the greater the distance from the light source unit, the greater the amount of shift in the position of the light beam due to the variation in the implementation. According to the present configuration, in the case where the light beam flux outputted from the light source unit is reduced in the two directions, the light beam flux is first reduced in the major axis direction, whereby the light beam flux is unlikely to be affected by the variation in the implementation.

Further, when viewed in the direction parallel to the traveling direction of the light beam flux that enters the reduction system described above, the light source apparatus is compact as compared with the related art described above.

In the first aspect described above, it is preferable that the first reflection surface inclines by 45° with respect to a normal to the first surface, and that the second reflection surface is so disposed as to be parallel to the first reflection surface.

According to the configuration described above, the optical axis of the light beam that enters the optical element is readily allowed to be parallel to the optical axis of the light beam that exits out of the optical element.

A second aspect of the invention relates to an illuminator including the light source apparatus described above.

In the illuminator according to the second aspect, the amount of optical loss is relatively small.

A third aspect of the invention relates to a projector including the illuminator according to the second aspect, a light modulator that modulates light outputted from the illuminator in accordance with image information to form image light, and a projection system that projects the image light.

According to the second aspect, since the illuminator described above is provided, a projector having a relatively small amount of optical loss can be provided.

DESCRIPTION OF EMBODIMENTS

Figure 1:
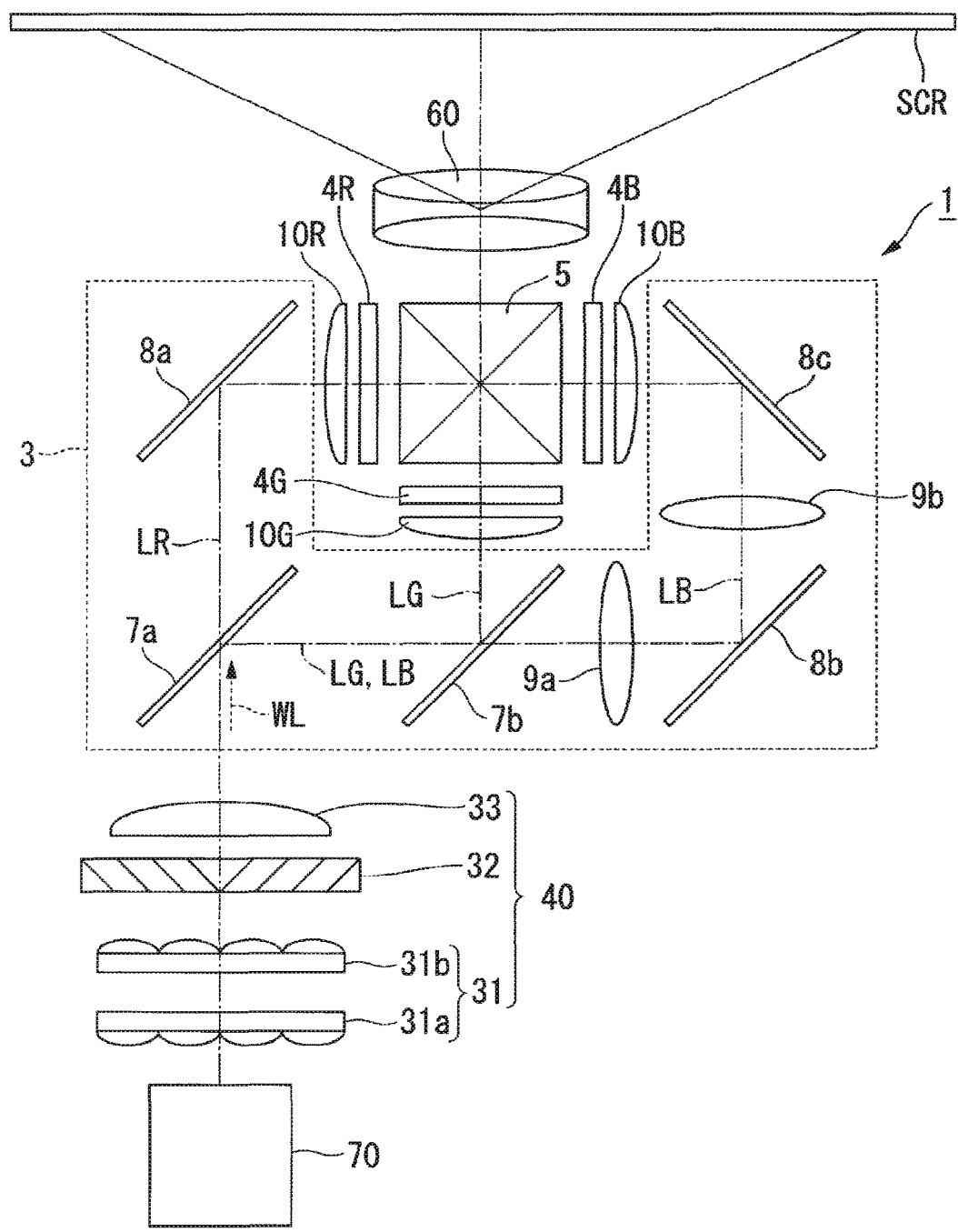
FIG. 1 is a schematic configuration diagram showing a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

A projector according to the present embodiment is an example of a projector using three transmissive liquid crystal light valves.

Figure 2:
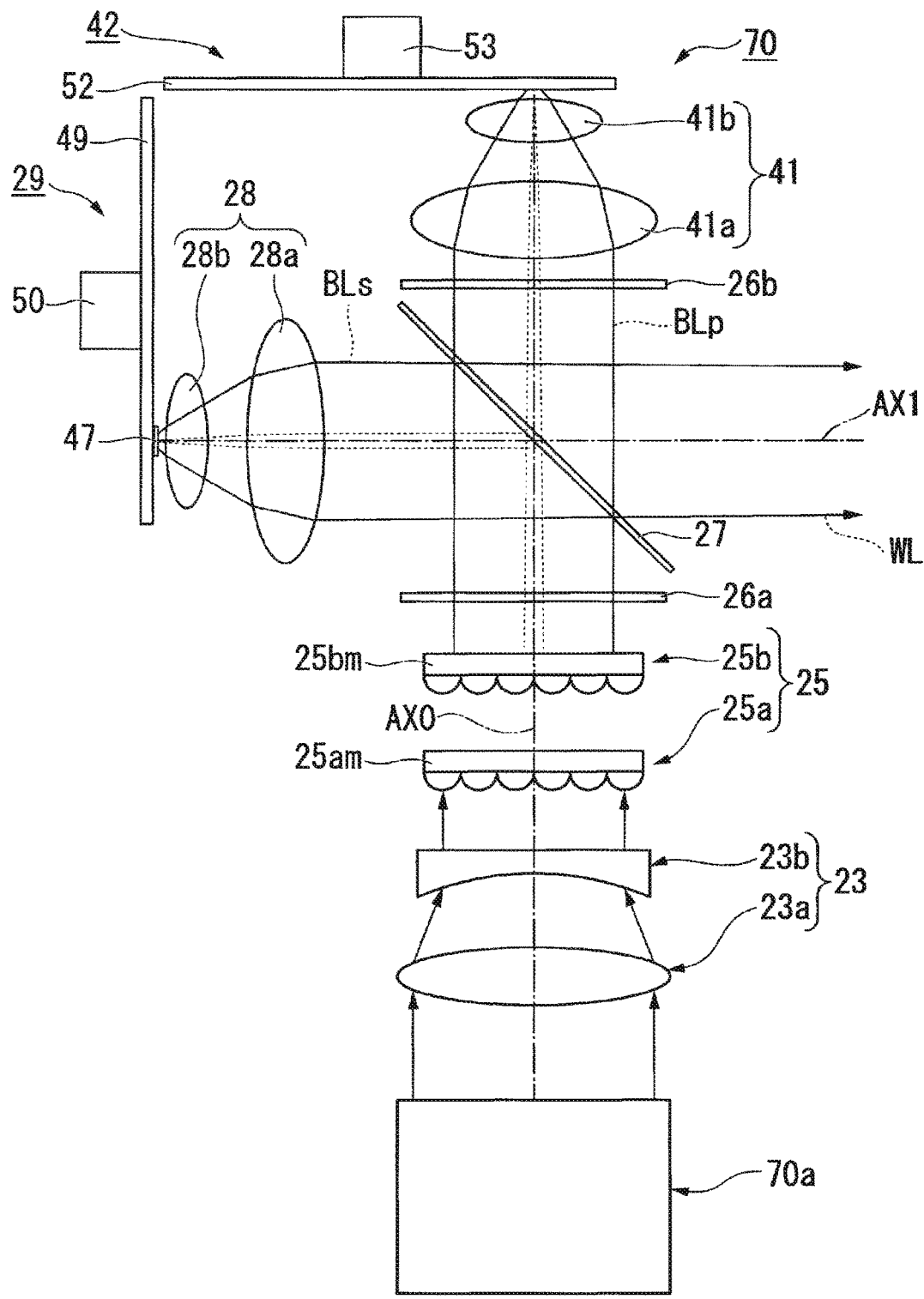
FIG. 2 is a schematic configuration diagram showing an illuminator according to the first embodiment.

FIG. 1 is a schematic configuration diagram showing the projector according to the present embodiment. FIG. 2 is a schematic configuration diagram showing an illuminator according to the present embodiment.

A projector 1 according to the present embodiment is a projection-type image display apparatus that displays a color image on a screen SCR, as shown in FIG. 1. The projector 1 generally includes an illuminator 70, a uniform illumination system 40, a color separation system 3, a light modulator 4R for red light, a light modulator 4G for green light, a light modulator 4B for blue light, a light combining system 5, and a projection system 60.

The illuminator 70 outputs white illumination light WL toward the uniform illumination system 40. The illuminator 70 includes a light source apparatus according to an embodiment of the invention, which will be described later.

The uniform illumination system 40 includes a homogenizer system 31, a polarization conversion element 32, and a superimposing system 33.

The homogenizer system 31 is formed of a first multiple lens array 31a and a second multiple lens array 31b.

The uniform illumination system 40 achieves a uniform intensity distribution of the illumination light WL outputted from the illuminator 70 in each of the light modulators 4R, 4G, and 4B, each of which is an illuminated area. The illumination light WL having exited out of the uniform illumination system 40 enters the color separation system 3.

The color separation system 3 separates the illumination light WL having exited out of the illuminator 70 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL outputted from the illuminator 70 into the red light LR and light containing the green light LG and the blue light LB. The first dichroic mirror 7a transmits the red light LR and reflects the green light LG and the blue light LB. The second dichroic mirror 7b has the function of separating the light reflected off the first dichroic mirror 7a into the green light LG and the blue light LB. The second dichroic mirror 7b reflects the green light LG and transmits the blue light LB.

The first reflection mirror 8a is disposed in the optical path of the red light LR. The first reflection mirror 8a reflects the red light LR having passed through the first dichroic mirror 7a toward the light modulator 4R. The second reflection mirror 8b and the third reflect ion mirror 8c are disposed in the optical path of the blue light LB. The second reflection mirror 8b and the third reflection mirror 8c guide the blue light LB having passed through the second dichroic mirror 7b to the light modulator 4B. The green light LG is reflected off the second dichroic mirror 7b and travels toward the light modulator 4G.

The first relay lens 9a and the second relay lens 9b are disposed in the optical path of the blue light LB and on the light exiting side of the second dichroic mirror 7b. The first relay lens 9a and the second relay lens 9b have the function of compensating optical loss of the blue light LB resulting from the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulator 4R, the light modulator 4G, and the light modulator 4B are each formed, for example, of a transmissive liquid crystal panel. Polarizers that are not shown are disposed on the light incident side and the light exiting side of each of the liquid crystal panels. The polarizers transmit linearly polarized light having a specific polarization direction.

A field lens 10R is disposed on the light incident side of the light modulator 4R. A field lens 10G is disposed on the light incident side of the light modulator 4G. A field lens 10B is disposed on the light incident side of the light modulator 4B. The field lens 10R parallelizes the red light LR to be incident on the light modulator 4R. The field lens 10G parallelizes the green light LG to be incident on the light modulator 4G. The field lens 10B parallelizes the blue light LB to be incident on the light modulator 4B.

The light combining system 5 combines the image light fluxes corresponding to the red light LR, the green light LG, and the blue light LB with one another and causes the combined image light to exit toward the projection system 60. The light combining system 5 is formed, for example, of a cross dichroic prism.

The projection system 60 is formed of a projection lens group including a plurality of projection lenses. The projection system 60 enlarges the combined image light from the light combining system 5 and projects the enlarged image light toward the screen SCR. An enlarged color image is thus displayed on the screen SCR.

The illumination apparatus 70 will be described below.

The illumination apparatus 70 includes a light source apparatus 70A, an afocal system 23, a homogenizer system 25, a first retardation film 26a, a polarizing beam splitter 27, a first pickup system 28, a phosphor wheel (wavelength conversion element) 29, which includes a phosphor layer, a second retardation film 26b, a second pickup system 41, and a rotating diffusion element 42, as shown in FIG. 2. The polarizing beam splitter is hereinafter abbreviated to a PBS.

The light source apparatus 70A, the afocal system 23, the homogenizer system 25, the first retardation film 26a, the PBS 27, the second retardation film 26b, and the second pickup system 41 are arranged on an optical axis AX0. The first pickup system 28 is disposed on an optical axis AX1, which is perpendicular to the optical axis AX0.

Figure 3:
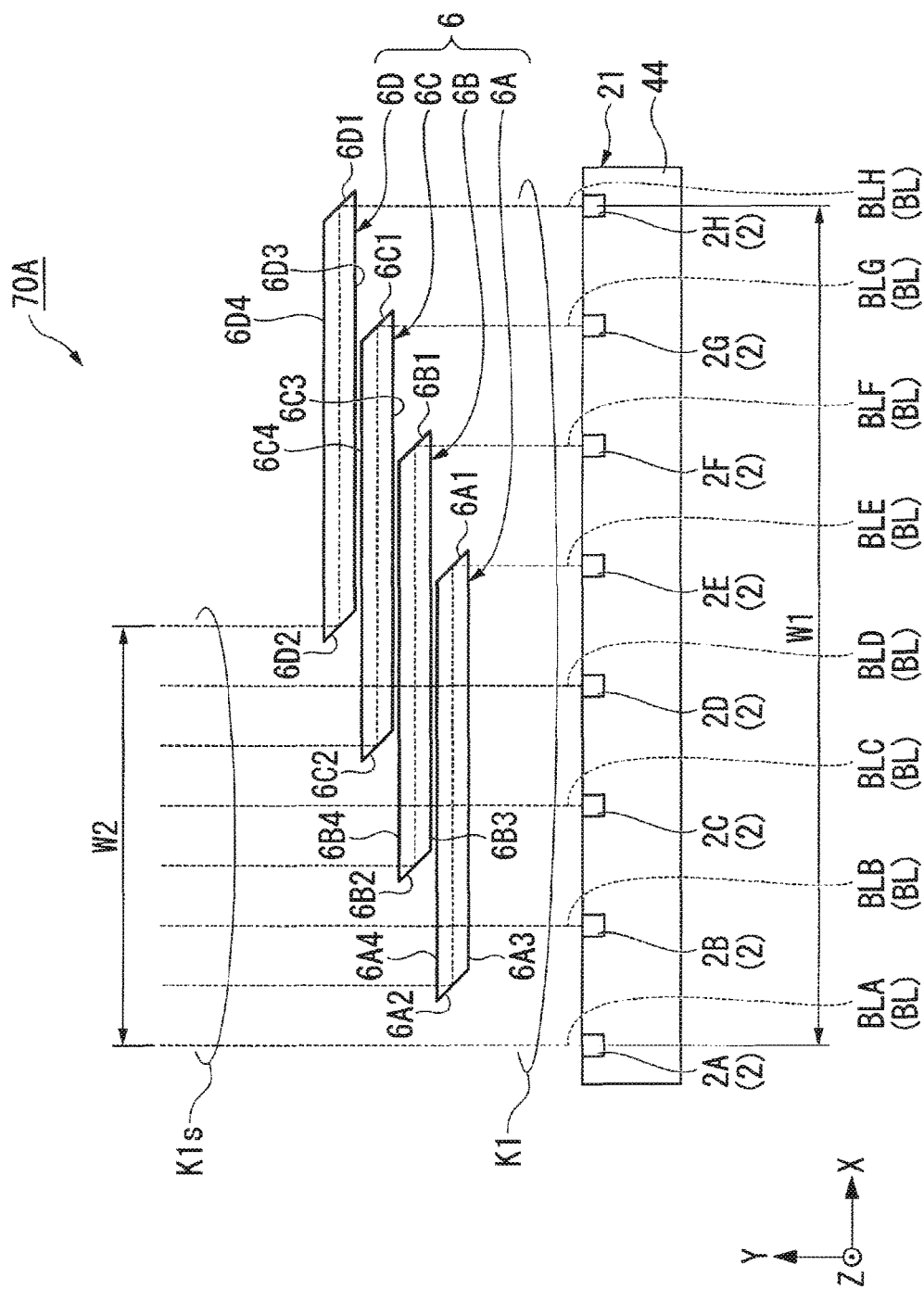
FIG. 3 shows a schematic configuration of a light source apparatus in the first embodiment.

FIG. 3 shows a schematic configuration of the light source apparatus 70A.

The light source apparatus 70A includes a light source unit 21 and a reduction system 6, as shown in FIG. 3.

The light source unit 21 includes a plurality of semiconductor lasers 2, each of which is a solid-state light source. A collimator lens (not shown) that converts light into a parallelized light flux is provided on the light exiting side of each of the semiconductor lasers 2. The semiconductor lasers 2 each emit, for example, a blue light beam BL. In the present embodiment, the light source unit 21 outputs a light beam flux K1 formed of a plurality of light beams BL.

The semiconductor lasers 2 provided in the light source unit 21 are arranged in a matrix formed of 8 rows and 4 columns (see FIG. 4, which will be described later). In the laser columns, the direction in which 8 semiconductor lasers 2 are arranged is called an X-axis direction, the direction in which 4 laser columns are arranged is called a Z-axis direction, and the direction perpendicular to the X axis and the Z axis is called a Y axis, as shown in FIG. 3. The direction in which the semiconductor lasers 2 emit light beams is parallel to the Y axis. FIG. 3 is a cross-sectional view including one of the four laser columns. The number of semiconductor lasers 2 and the arrangement thereof are not limited to a specific number and arrangement.

The reduction system 6 reduces the light beam flux K1, which is outputted from the light source unit 21 and travels in the +Y direction (second direction), in the −X direction (first direction), which intersects the +Y direction, and causes the resultant light beam flux to exit as a reduced light beam flux K1s. The light beam flux K1s having exited out of the reduction system 6 enters the afocal system 23. In the present embodiment, when a direction is mentioned, the orientation matters. For example, the first direction in the present embodiment is not the +X direction but is the −X direction.

In the present embodiment, the reduction system 6 includes a plurality of prisms (optical elements). The prisms have the same configuration. Specifically, the reduction system 6 includes a first prism 6A, a second prism 6B, a third prism 6C, and a fourth prism 6D.

The first prism 6A, the second prism 6B, the third prism 6C, and the fourth prism 6D correspond to the "P optical elements" in the claims.

In the following description, the first prism 6A, the second prism 6B, the third prism 6C, and the fourth prism 6D are abbreviated to and simply called prisms 6A, 6B, 6C, and 6D in some cases. The prisms 6A, 6B, 6C, and 6D are arranged in this order on the light exiting side of the light source unit 21.

Each of the prisms 6A, 6B, 6C, and 6D is formed of a plate-shaped member extending along the Z direction in FIG. 3 and also shifts the optical paths of the light beams emitted from the semiconductor lasers 2 that belong to the other laser columns in the −X direction.

The first prism 6A has a first reflection surface 6A1, which is provided at a first end (+X-side end), and a second reflection surface 6A2, which is provided at a second end (−X-side end) facing the first end. The first prism 6A further has a first surface 6A3 and a second surface 6A4, which are provided between the first end and the second end. The first prism 6A further has a first surface 6A3 and a second surface 6A4, which are provided on the portion between the first end and the second end. The first surface 6A3 and the second surface 6A4 are parallel to each other. The first reflection surface 6A1 and the second reflection surface 6A2 are each formed of a reflection member that reflects the light beams BL, for example, a mirror. The first surface 6A3 and the second surface 6A4 each transmit the light beams BL.

The first reflection surface 6A1 inclines by 45° with respect to the direction of a normal to the first surface 6A3 (Y direction). The first reflection surface 6A1 can therefore reflect a light beam BL traveling in the Y direction in such a way that the light beam BL is deflected counterclockwise by 90°.

The second reflection surface 6A2 inclines by 45° with respect to the direction of a normal to the second surface 6A4 (Y direction). The second reflection surface 6A2 can therefore reflect the light beam BL reflected off the first reflection surface 6A1 and traveling through the first prism 6A in such a way that the light beam BL is deflected clockwise by 90°.

The prism 6B has a first surface 6B3, a second surface 6B4, a first reflection surface 6B1, and a second reflection surface 6B2. The prism 6C has a first surface 6C3, a second surface 6C4, a first reflection surface 6C1, and a second reflection surface 6C2. The prism 6D has a first surface 6D3, a second surface 6D4, a first reflection surface 6D1, and a second reflection surface 6D2. The prisms 6B, 6C, and 6D are configured in the same manner as the prism 6A and will therefore not be described in detail.

In the present embodiment, the reduction system 6 includes the prisms 6A, 6B, 6C, and 6D laminated on each other in the traveling direction of the light beams BL (Y direction). The prisms 6A, 6B, 6C, and 6D are bonded to each other, for example, with adhesive layers (not shown) therebetween. In FIG. 3, the prisms 6A, 6B, 6C, and 6D are drawn with gaps therebetween for ease of illustration.

The present inventors have made a finding that it is important to arrange the prisms 6A, 6B, 6C, and 6D on the basis of the following arrangement rules for reduction of the light beam flux B1 outputted from the light source unit 21 with a small amount of optical loss.

In the arrangement rules in the embodiment of the invention, the following first condition needs to be satisfied: "A first reflection surface of a second optical element is shifted from a first reflection surface of a first optical element in the direction opposite a first direction, or a second reflection surface of the second optical element is shifted from a second reflection surface of the first optical element in the direction opposite the first direction."

Further, in the arrangement rules in the embodiment of the invention, it is more desirable to satisfy the following second condition: "When R is an arbitrary integer greater than or equal to 2 but smaller than or equal to P, a first reflection surface of an R-th optical element is shifted from a first reflection surface of an (R−1)-th optical element in the direction opposite the first direction, and a second reflection surface of the R-th optical element is shifted from a second reflection surface of the (R−1)-th optical element in the direction opposite the first direction."

The reduction system 6 in the present embodiment includes the prisms 6A, 6B, 6C, and 6D sequentially arranged in the +Y direction (second direction). The following description will be made with reference to the prisms 6A and 6B as two prisms adjacent to each other.

In this case, the prisms 6A, 6B, 6C, and 6D correspond to the "P optical elements" in the claims, and the number of optical elements or P is "4".

Further, the prism 6A corresponds to the "first optical element" in the claims, and the prism 6B corresponds to the "second optical element" in the claims.

The prism 6A also corresponds to the "(R−1)-th optical element" in the claims, and the prism 6B also corresponds to the "R-th optical element" in the claims.

In the present embodiment, the prisms 6A, 6B, 6C, and 6D are so arranged as to be shifted stepwise in the +X direction, which is opposite the direction in which the light beam flux K1 is reduced (first direction).

Specifically, in the present embodiment, the first reflection surface 6B1 of the prism 6B is shifted from the first reflection surface 6A1 of the prism 6A in the direction (+X direction) opposite the direction in which the light beam flux K1 is reduced (−X direction), and the second reflection surface 6B2 of the prism 6B is shifted from the second reflection surface 6A2 of the prism 6A in the +X direction on the basis of the arrangement rule that satisfies the first condition described above.

In the present embodiment, the prisms 6B and 6C, which are sequentially arranged in the +Y direction, also satisfy the first condition, and the prisms 6C and 6D, which are sequentially arranged in the +Y direction, also satisfy the first condition. The reduction system 6 therefore also satisfies the second condition.

The present inventors has found that following the arrangement rule that satisfies the condition 1 described above allows avoidance of an arrangement pattern in which the number of locations where a light beam BL passes an optical element that does not correspond to the light beam BL is maximized in the reduction system 6 as a whole. The optical element that does not correspond to a light beam BL is an optical element that does not shift the optical path of the light beam BL.

The structure of the reduction system 6 will be described below.

On each of the prisms 6A, 6B, 6C, and 6D is incident the light beam BL emitted from the corresponding laser out of the plurality of semiconductor lasers 2. In the following sections, the plurality of semiconductor lasers 2 arranged from the −X side toward the +X side in FIG. 3 are sequentially referred to as semiconductor lasers 2A, 2B, 2C, 2D, 2E, 2F, 2G, and 2H for ease of description.

In the present embodiment, a light beam BLA emitted from the semiconductor laser 2A enters none of the prisms but travels straight.

A light beam BLB emitted from the semiconductor laser 2B is incident on the first surface 6A3 of the prism 6A, passes through the prism 6A, and exits through the second surface 6A4. That is, the light beam BL from the semiconductor laser 2B passes through the prism 6A.

A light beam BLC emitted from the semiconductor laser 2C passes through the prisms 6A and 6B. Similarly, a light beam BLD emitted from the semiconductor laser 2D passes through the prisms 6A, 6B, and 6C. The number of locations where a light beam BL passes through an optical element that does not correspond to the light beam BL is 6 in the reduction system 6 as a whole.

In FIG. 3, the prism 6A is disposed in correspondence with the semiconductor laser 2E, the prism 6B is disposed in correspondence with the semiconductor laser 2F, the prism 6C is disposed in correspondence with the semiconductor laser 2G, and the prism 6D is disposed in correspondence with the semiconductor laser 2H.

Figure 4A:
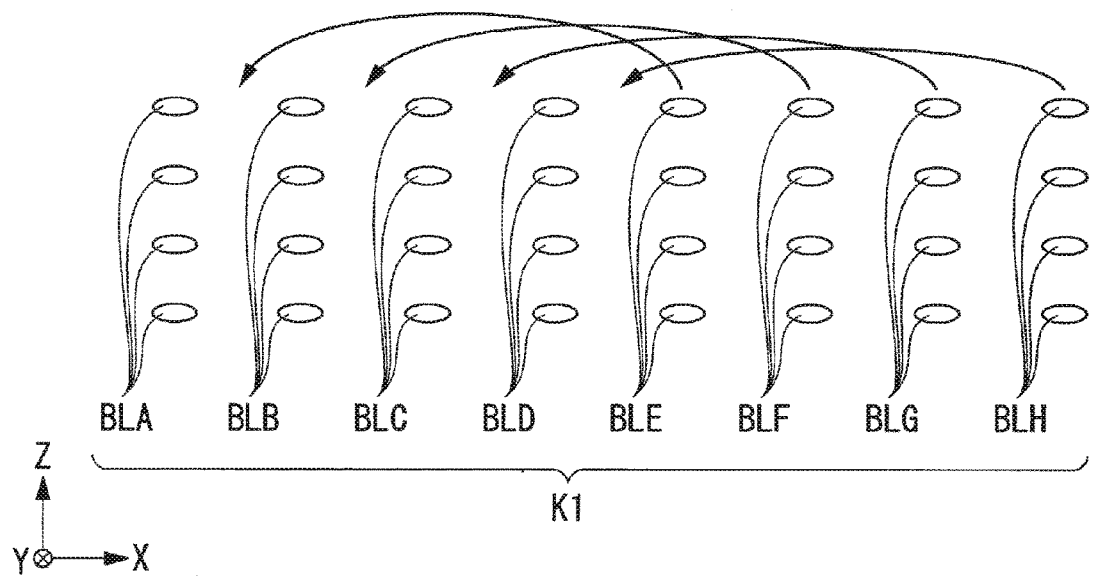
FIGS. 4(a) and 4(b) show the state of reduction of a light beam flux achieved by a reduction system in the first embodiment.
Figure 4B:
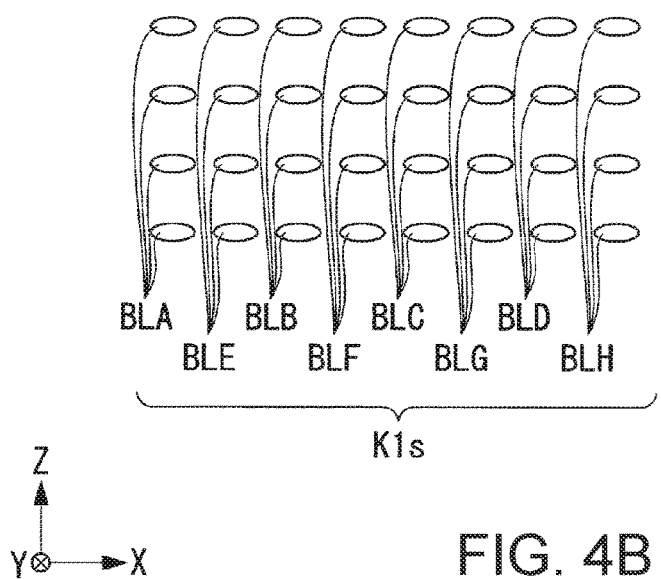

FIGS. 4 (*a*) and 4 (*b*) show reduction of the light beam flux achieved by the reduction system 6. FIG. 4(*a*) shows the light beam flux K1 before the reduction, and FIG. 4 (*b*) shows the reduced light beam flux K1*s* after the reduction.

A light beam BLE emitted from the semiconductor laser 2E passes through the first surface 6A3 of the first prism 6A, is incident on the first reflection surface 6A1, is reflected off the first reflection surface 6A1 and the second reflection surface 6A2 in this order, passes through the second surface 6A4, and exits out of the first prism 6A. As a result, the optical path of the light beam BLE is shifted by the first prism 6A in the −X direction, as shown in FIG. 4(*a*). The light beam BLE is therefore located in a position between the light beam BLA and the light beam BLB, as shown in FIG. 4(*b*).

The optical path of a light beam BLF emitted from the semiconductor laser 2F is shifted by the prism 6B in the −X direction, as in the case of the light beam BLE, as shown in FIG. 4(*a*). The optical path of a light beam BLG emitted from the semiconductor laser 2G is shifted by the prism 6C in the −X direction, as in the case of the light beam BLE. The optical path of a light beam BLH emitted from the semiconductor laser 2H is shifted by the prism 6D in the −X direction, as in the case of the light beam BLE. The light beam BLF is therefore located in a position between the light beam BLB and the light beam BLC, as shown in FIG. 4(*b*). The light beam BLG is located in a position between the light beam BLC and the light beam BLD. The light beam BLH is located in the vicinity of the +X side of the light beam BLD.

As described above, the reduction system 6 converts the light beam flux K1 having a light flux width W1 into the reduced light beam flux K1*s* having a light flux width W2. The traveling direction of the reduced light beam flux K1*s* is roughly the same as the traveling direction of the light beam flux K1 when it enters the reduction system 6.

An effect of the reduction system 6 in the present embodiment will be described with reference to a reduction system according to Comparative Example.

Figure 5:
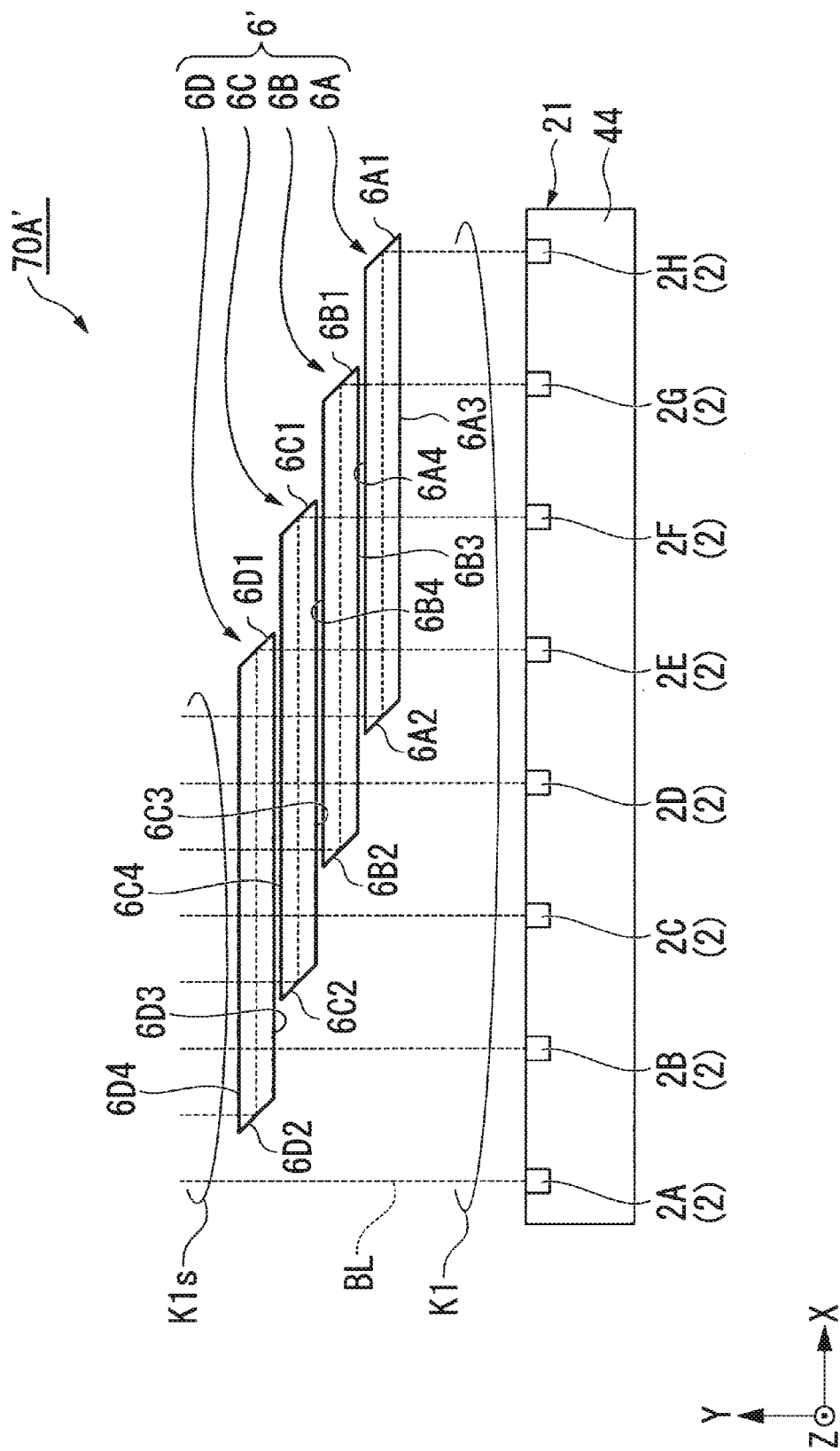
FIG. 5 shows the configuration of a reduction system according to Comparative Example.

FIG. 5 shows a light source apparatus 70A' including a reduction system 6' according to Comparative Example.

The light source apparatus 70A' includes the reduction system 6' in place of the reduction system 6 in the light source apparatus 70A according to the present embodiment.

The reduction system 6' includes the prisms 6A, 6B, 6C, and 6D as the reduction system 6 does but differs therefrom in terms of the arrangement of the prisms 6A, 6B, 6C, and 6D. It is, however, noted that the reduction system 6 and the reduction system 6' have the same reduction magnification and reduction direction.

The reduction system 6' satisfies the conditions of "When R is an arbitrary integer greater than or equal to 2 but smaller than or equal to P, a first reflection surface of an R-th optical element is shifted from a first reflection surface of an (R−1)-th optical element in the first direction, and a second reflection surface of the R-th optical element is shifted from a second reflection surface of the (R−1)-th optical element in the first direction," as shown in FIG. 5. That is, the first condition is not satisfied.

In the reduction system 6', the number of locations where light beams BL pass through the prism 6A' is 3. The number of locations where light beams BL pass through the prism 6B' is 4. The number of locations where light beams BL pass through the prism 6C' is 5. The number of locations where light beams BL pass through the prism 6D' is 6. That is, the number of locations where the light beams BL pass through the prisms is 18 in the reduction system 6' as a whole. The reduction system 6' shown in the present Comparative Example is an example in which the number of locations where the light beams BL pass through the prisms is maximized in the reduction system 6' as a whole. Since part of the light beams BL is reflected off the surfaces of the prisms, the amount of loss of the light beam flux K1 increases as the number of locations where the light beams BL pass through the prisms increases. In contrast, according to the reduction system 6 in the present embodiment shown in FIG. 3, the number of locations where a light beam BL passes through an optical element that does not correspond to the light beam BL is 6. The decrease in the amount of light beam flux K1 can therefore be suppressed, as compared with the case where the first condition is not satisfied. The light beam flux K1 can therefore be efficiently used.

The parallelism between the first reflection surface 6A1 and the second reflection surface 6A2 of the prism 6A depends on the processing precision in the manufacture of the prism. The same holds true for the prisms 6B, 6C, and 6D. The reduction system 6 including the prisms 6A, 6B, 6C, and 6D therefore does not need to be implemented with high precision. For example, even if the direction in which the prism 6A is implemented deviates from a predetermined direction around the Z axis, the light beam BLE shifted by the prism 6A is parallel to the light beam BLE before it is incident on the prism 6A as long as the angle of deviation is small. The optical axis of the light that enters the reduction system 6 is therefore readily allowed to be parallel to the optical axis of the light that exits out of the reduction system 6. The reduction system 6 therefore reduces the light beam flux K1 outputted from the light source unit 21 and allows the reduced light beam flux K1*s* formed of a plurality of light beams BL parallel to one another to exit in a direction roughly the same as the traveling direction of the light beam flux K1. Further, since no high implementation precision is required, the reduction system 6 can be readily assembled.

The reduced light beam flux K1*s*, which has a light flux width reduced by the reduction system 6, enters the afocal system 23. The afocal system 23 is a reduction-type afocal system that further reduces the reduced light beam flux K1*s*. In a case where further reduction in the light flux width of the reduced light beam flux K1*s* is not required, the afocal system 23 is not required.

The afocal system 23 is formed, for example, of a convex lens 23a and a concave lens 23b. In the present embodiment, since the reduced light beam flux K1s reduced by the reduction system 6 enters the afocal system 23, the afocal magnification of the afocal system 23 is set at a relatively small value. The light having passed through the afocal system 23 is therefore unlikely to be affected by variation in the implementation of the plurality of semiconductor lasers 2. The plurality of semiconductor lasers 2 are therefore not required to be aligned with one another with high precision.

The homogenizer system 25 achieves a uniform intensity distribution of the reduced light beam flux K1s having exited out of the reduction system 6 in the illuminated areas. The homogenizer system 25 is formed, for example, of a first multiple lens array 25a and a second multiple lens array 25b. The first multi-lens array 25a has a plurality of lenses 25am arranged at equal intervals. The second multi-lens array 25b has a plurality of lenses 25bm arranged at the same intervals at which the lenses 25am described above are arranged.

The first retardation film 26a is, for example, a rotatable half-wave plate. Since the light emitted from each of the semiconductor lasers 2 is linearly polarized light, the half-wave plate set at an appropriate angle of rotation allows the light having passed through the first retardation film 26a to contain an S-polarized component and a P-polarized component with respect to the PBS 27 at a predetermined ratio therebetween. Rotating the first retardation film 26a allows the ratio between the S-polarized component and the P-polarized component to be changed.

The PBS 27 is so disposed as to incline with respect to the optical axes AX0 and AX1 by 45°. The PBS 27 reflects the S-polarized light component of light incident thereon and transmits the P-polarized light component of the incident light. The S-polarized light component is reflected off the PBS 27 and directed toward the phosphor wheel 29. The P-polarized light component passes through the PBS 27 and travels toward the rotating diffusion element 42.

An S-polarized light beam BLs having exited out of the PBS 27 enters the first pickup system 28. The first pickup system 28 causes the light beam BLs to converge and directs the convergent light beam BLs toward a phosphor layer 47 on the phosphor wheel 29. The first pickup system 28 is formed, for example, of a first pickup lens 28a and a second pickup lens 28b.

The light having exited out of the first pickup system 28 is incident on the phosphor wheel 29. The phosphor wheel 29 is a reflective rotating fluorescent plate and includes the phosphor layer 47, which emits fluorescence, a rotating plate 49, which supports the phosphor layer 47, a reflection film (not shown) that is provided between the phosphor layer 47 and the rotating plate 49 and reflects the fluorescence, and a drive motor 50, which drives the rotating plate 49. The rotating plate 49 is, for example, a circular plate, but the rotating plate 49 is not limited to a circular plate and only needs to be a flat plate.

The phosphor layer 47 contains phosphor particles that absorb the light beam BLs, convert the light beam BLs into yellow fluorescence, and emit the yellow fluorescence. The phosphor particles can, for example, be a YAG-based (yttrium-aluminum-garnet-based) phosphor. The phosphor particles may be made of one type of material or may be a mixture of particles made of two or more types of material.

On the other hand, a P-polarized light beam BLp having exited out of the PBS 27 is incident on the second retardation film 26b. The second retardation film 26b is a quarter-wave plate. The light beam BLp is converted into circularly polarized light when it passes through the second beam 26b.

The light beam BLp having passed through the second beam 26b enters the second pickup system 41. The second pickup system 41 causes the light incident thereon to converge and directs the convergent light toward the rotating diffusion element 42. The second pickup system 41 is formed, for example, of a first pickup lens 41a and a second pickup lens 41b.

The rotating diffusion element 42 includes a diffusing reflective plate 52 and a drive motor 53 for rotating the diffusing reflective plate 52. The diffusing reflective plate 52 diffuses the circularly polarized light beam BLp having exited out of the second pickup system 41 and reflects the diffused light beam toward the PBS 27. The diffusing reflective plate 52 preferably causes the light beam BLp incident on the diffusing reflective plate 52 to undergo Lambert reflection. The drive motor 50 has a rotating shaft disposed roughly parallel to the optical axis AX0. The diffusing reflective plate 52 is thus rotatable in a plane that intersects the optical axis of the light incident on the diffusing reflective plate 52. The diffusing reflective plate 52 has, for example, a circular shape when viewed in the direction of the rotating shaft, but the diffusing reflective plate 52 is not limited to a circular plate and only needs to be a flat plate.

The circularly polarized light beam BLp having been reflected off the diffusing reflective plate 52 and having passed through the second pickup system 41 again passes through the second retardation film 26b again and forms an S-polarized light beam BLp.

The yellow fluorescence having been emitted from the phosphor layer 47 and the light beam BLp (blue light) having exited out of the rotating diffusion element 42 are combined with each other by the PBS 27 into the white illumination light WL. The illumination light WL enters the uniform illumination system 40 shown in FIG. 1.

The light source apparatus 70A according to the present embodiment, in which the optical paths of the light beams BL are shifted in the first direction, allows reduction in the cross section of the light beam flux K1. Further, the traveling direction of the reduced light beam flux K1s is roughly the same as the traveling direction of the light beam flux K1. The light source apparatus 70A and other parts are therefore laid out with high flexibility. Moreover, the prisms 6A, 6B, 6C, and 6D, transmit light beams BL the optical paths of which are not shifted and do not therefore block the light beams BL. The prisms 6A, 6B, 6C, and 6D are therefore arranged with high flexibility.

Second Embodiment

A second embodiment of the invention will be subsequently described. The present embodiment differs from the first embodiment in terms of the structure of the reduction system, and the other configurations are the same in the two embodiments. Therefore, in the following description, the same configurations and members as those in the first embodiment have the same reference characters and will not be described in detail.

Figure 6:
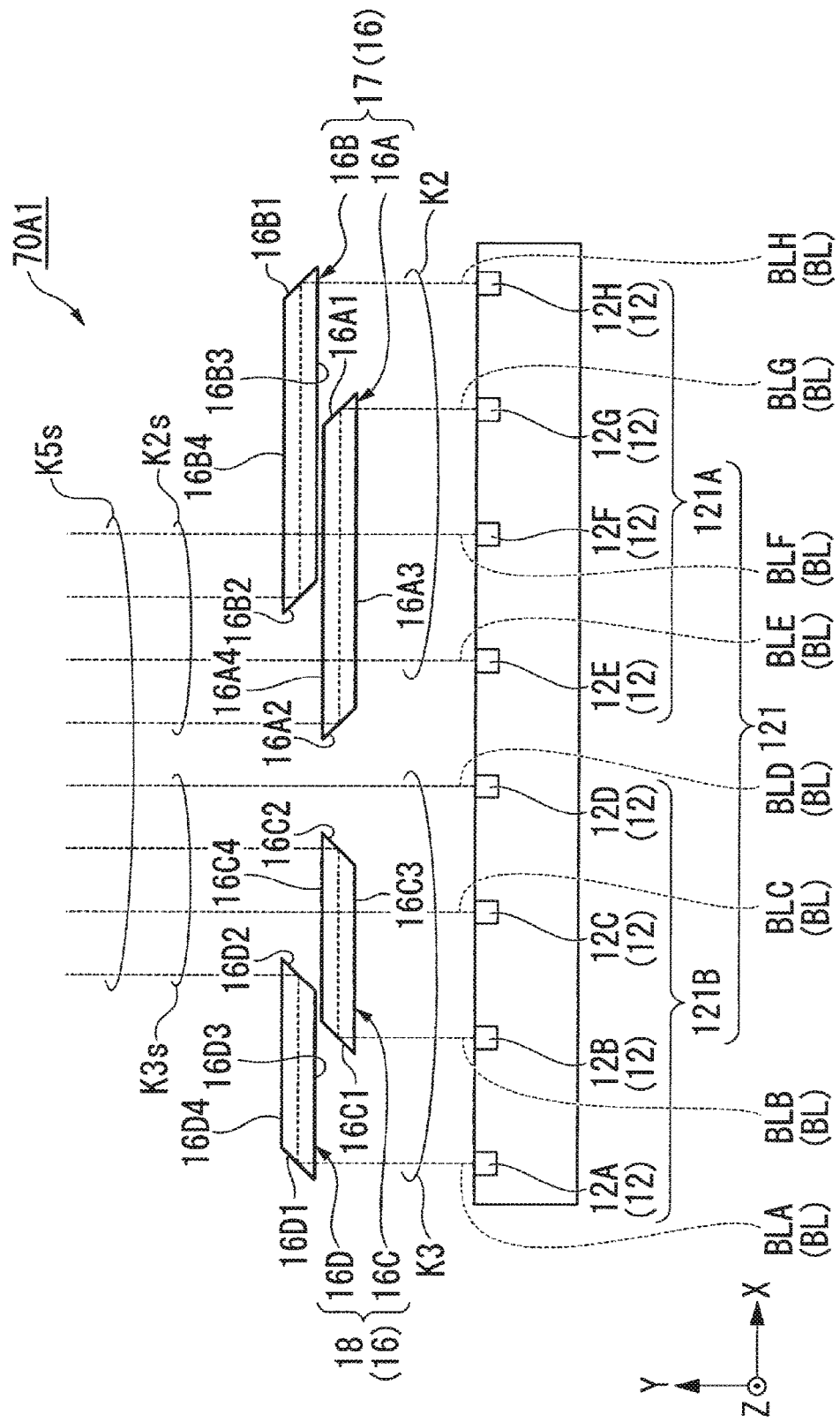
FIG. 6 shows the configuration of a light source apparatus including a reduction system according to a second embodiment.

FIG. 6 shows the configuration of a light source apparatus 70A1 including a reduction system 16 according to the present embodiment.

The light source apparatus 70A1 according to the present embodiment includes a light source unit 121 and the reduction system 16, as shown in FIG. 6. In the present embodiment, the light source unit 121 includes a first light source unit 121A and a second light source unit 121B. In the present embodiment, the first light source unit 121A and the second light source unit 121B are integrated with each other but may instead be separate units.

The first light source unit 121A and the second light source unit 121B each include a plurality of semiconductor laser 12. The semiconductor laser 12 each emit, for example, a blue light beam BL.

The semiconductor lasers 12 provided in each of the first light source unit 121A and the second light source unit 121B are arranged in a matrix formed of 4 rows and 4 columns (see FIG. 7, which will be described later). That is, 32 semiconductor lasers 2 are arranged in total. It is assumed that the row direction is the Z direction and the column direction is the X direction. The number of semiconductor lasers 12 and the arrangement thereof are not limited to a specific number and arrangement.

In the present embodiment, the first light source unit 121A outputs a light beam flux K2 formed of a plurality of light beams BL. The second light source unit 121B outputs a light beam flux K3 (second light beam flux) formed of a plurality of light beams BL. The light beam flux K2 corresponds to the light beam flux in the claims.

The reduction system 16 in the present embodiment includes a first reduction system 17 and a second reduction system 18. The reduction system 16 reduces the light beam fluxes K2 and K3 and causes the resultant light beam fluxes as a reduced light beam flux K5s.

The first reduction system 17 reduces the light beam flux K2, which travels in the +Y direction (second direction), in the −X direction (first direction), which intersects the +Y direction, and causes the resultant light beam flux to exit as a reduced light beam flux K2s. The second reduction system 18 reduces the light beam flux K3, which travels in the +Y direction (second direction), in the +X direction (third direction), which is opposite the first direction described above, and causes the resultant light beam flux to exit as a reduced light beam flux K3s. The reduced light beam fluxes K2s and K3s form the reduced light beam flux K5s.

The first reduction system 17 includes prisms (optical elements) 16A and 16B. The second reduction system 18 includes prisms (optical elements) 16C and 16D.

In the present embodiment, the prisms 16A and 16B correspond to the "P optical elements" in the claims, and the number of optical elements or P is "2". Further, in the present embodiment, the second reduction system 18, which includes the prisms 16C and 16D, corresponds to the "second reduction system including Q optical elements" in the claims, and the number of optical elements or "Q" is 2. Further, the prism 16A corresponds to the "first optical element" in the claims, and the prism 16B corresponds to the "second optical element" in the claims.

Each of the prisms 16A, 16B, 16C, and 16D is formed of a plate-shaped member extending along the Z direction in FIG. 6 and also shifts the optical paths of the light beams emitted from the semiconductor lasers 12 that belong to the other laser columns in the X direction.

The prism 16A has a first surface 16A3, a second surface 16A4, a first reflection surface 16A1, and a second reflection surface 16A2. The prism 16B has a first surface 16B3, a second surface 16B4, a first reflection surface 16B1, and a second reflection surface 16B2. The prism 16C has a third surface 16C3, a fourth surface 16C4, a third reflection surface 16C1, and a fourth reflection surface 16C2. The prism 16D has a third surface 16D3, a fourth surface 16D4, a third reflection surface 16D1, and a fourth reflection surface 16D2. The prisms 16A, 16B, 16C, and 16D are configured in the same manner as the prism 6A in the first embodiment and will therefore not be described in detail.

Also in the reduction system 16 in the present embodiment, the prisms 16A, 16B, 16C, and 16D are arranged on the basis of the predetermined arrangement rules.

In the present embodiment, the prisms 16A and 16B, which form the first reduction system 17, are arranged on the basis of the arrangement rule that satisfies the second condition described above. Specifically, the first reflection surface 16B1 of the prism 16B is shifted from the first reflection surface 16A1 of the prism 16A in the direction (+X direction) opposite the direction in which the light beam flux K2 is reduced (−X direction). Further, the second reflection surface 16B2 of the prism 16B is shifted from the second reflection surface 16A2 of the prism 16A in the +X direction.

The prism 16A corresponds to the "(R−1)-th optical element" in the claims, and the prism 16B corresponds to the "R-th optical element" in the claims.

Further, in the present embodiment, the prisms 16C and 16D, which form the second reduction system 18, are arranged on the basis of an arrangement rule that satisfies the following third condition: "When S is an arbitrary integer greater than or equal to 2 but smaller than or equal to Q, a third reflection surface of an S-th of the third optical elements is shifted from a third reflection surface of an (S−1)-th of the third optical elements in the first direction, and a fourth reflection surface of the S-th third optical element is shifted from a fourth reflection surface of the (S−1)-th third optical element in the first direction."

Specifically, in the present embodiment, the third reflection surface 16D1 of the prism 16D is shifted from the third reflection surface 16C1 of the prism 16C in the −X direction (first direction), and the fourth reflection surface 16D2 of the prism 16D is shifted from the fourth reflection surface 16C2 of the prism 16C in the −X direction (first direction).

The prism 16C corresponds to the "(S−1)-th third optical element" in the claims, and the prism 16D corresponds to the "S-th third optical element" in the claims.

Therefore, in the present embodiment, the plurality of reflection surfaces provided in the reduction system 16 are disposed in a bilaterally symmetric arrangement in FIG. 6.

The structures of the first reduction system 17 and the second reduction system 18 will be described below.

On each of the prisms 16A and 16B, which form the first reduction system 17, is incident the light beam BL emitted from the corresponding semiconductor laser 12 in the first light source unit 121A. In the following sections, the plurality of semiconductor lasers 12 that form the first light source unit 121A are sequentially referred to as semiconductor lasers 12E, 12F, 12G, and 12H from the −X side toward the +X side in FIG. 6 for ease of description.

The light beam BLE emitted from the semiconductor laser 12E passes through the prism 16A, as shown in FIG. 6. The light beam BL emitted from the semiconductor laser 12F passes through the prisms 16A and 16B.

The prism 16A is disposed in correspondence with the semiconductor laser 12G, and the prism 16B is disposed in correspondence with the semiconductor laser 2H.

On each of the prisms 16C and 16D, which form the second reduction system 18, is incident the light beam BL emitted from the corresponding semiconductor laser 12 in the second light source unit 121B. In the following sections, the plurality of semiconductor lasers 12 that form the second light source unit 121B are sequentially referred to as semiconductor lasers 12A, 12B, 12C, and 12D from the −X side toward the +X side in FIG. 6 for ease of description.

The light beam BLD emitted from the semiconductor laser 12D enters none of the prisms but travels straight, as shown in FIG. 6. The light beam BLC emitted from the semiconductor laser 12C passes through the prism 16C.

The prism 16C is disposed in correspondence with the semiconductor laser 12B, and the prism 16D is disposed in correspondence with the semiconductor laser 2A.

In the present embodiment, the light beam BLG emitted from the semiconductor laser 12G passes through the first surface 16A3 of the prism 16A, is incident on the first reflection surface 16A1, is reflected off the first reflection surface 16A1 and the second reflection surface 16A2 in this order, passes through the second surface 16A4, and exits out of the first prism 16A. As a result, the optical path of the light beam BLG is shifted by the first prism 16A in the −X direction.

Figure 7:
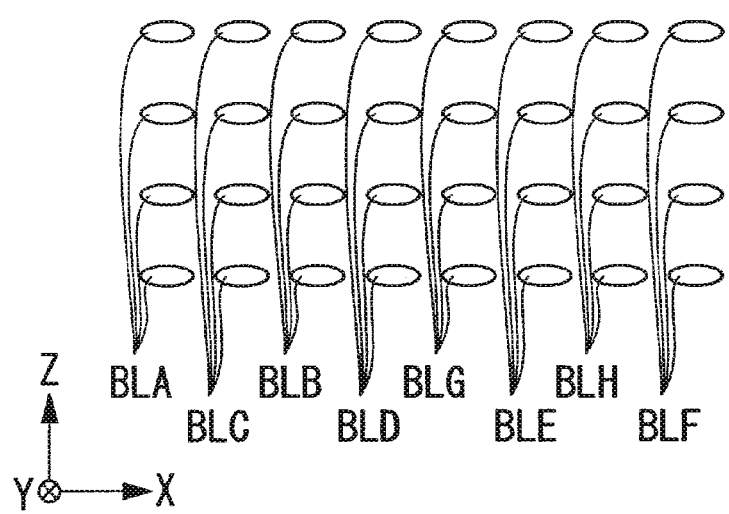
FIG. 7 shows the state of a light beam flux reduced by the reduction system in the second embodiment.

FIG. 7 shows the reduced light beam flux K5$s$ reduced by the reduction system 16.

The light beam BLG is located in a position between the light beam BLE and the light beam BLD, as shown in FIG. 7.

The optical path of the light beam BLH emitted from the semiconductor laser 12H is shifted by the prism 16B in the −X direction, as in the case of the light beam BLG, as shown in FIG. 6. The light beam BLH is located in a position between the light beam BLE and the light beam BLF in the reduced light beam flux K5$s$, as shown in FIG. 7.

The first reduction system 17 thus converts the light beam flux K2 into the reduced light beam flux K2$s$. The traveling direction of the reduced light beam flux K2$s$ is roughly the same as the traveling direction of the light beam flux K2 when it enters the first reduction system 17.

On the other hand, the light beam BLB emitted from the semiconductor laser 12B passes through the third surface 16C3 of the prism 16C in the second reduction system 18, is incident on the third reflection surface 16C1, is reflected off the third reflection surface 16C1 and the fourth reflection surface 16C2 in this order, passes through the fourth surface 16C4, and exits out of the prism 16C. As a result, the optical path of the light beam BLB is shifted by the prism 16C in the +X direction. The light beam BLB is located in a position between the light beam BLD and the light beam BLC in the reduced light beam flux K5$s$, as shown in FIG. 7.

The optical path of the light beam BLA emitted from the semiconductor laser 12A is shifted by the prism 16D in the +X direction, as in the case of the light beam BLB, as shown in FIG. 6. The light beam BLA is located in the vicinity of the −X side of the light beam BLC in the reduced light beam flux K5$s$, as shown in FIG. 7.

The second reduction system 18 thus converts the light beam flux K3 into the reduced light beam flux K3$s$. The traveling direction of the reduced light beam flux K3$s$ is roughly the same as the traveling direction of the light beam flux K3 when it enters the second reduction system 18.

The reduction system 16 in the present embodiment therefore converts the light beam flux containing the plurality of light beams BL emitted from the plurality of light beams BL emitted from the semiconductor lasers 2 into the reduced light beam flux K5$s$, which contains the reduced light beam flux K2$s$ and the reduced light beam flux K3$s$ described above.

Since the reduction system 16 in the present embodiment satisfies the second and third conditions, the number of locations where the light beams BL pass through the prisms can be minimized, as will be described later.

The number of locations where the light beams BL pass through the prism 16A is 2. The number of locations where the light beams BL pass through the prism 16B is 1. Since the first reduction system 17 satisfies the second condition, the number of locations where a light beam BL passes through an optical element that does not correspond to the light beam BL is minimized in the first reduction system 17 as a whole.

The number of locations where the light beams BL pass through the prism 16C is 1. The number of locations where the light beams BL pass through the prism 16D is 0. Since the second reduction system 18 also satisfies the second condition described above, the number of locations where a light beam BL passes through an optical element that does not correspond to the light beam BL is minimized in the second reduction system 18 as a whole. The number of locations where a light beam BL passes through an optical element that does not correspond to the light beam BL is 4 in the reduction system 16 as a whole.

The present embodiment differs from the first embodiment in terms of the reduction system, and the arrangement of the plurality of semiconductor lasers 2 is the same in the two embodiments. In the first embodiment, the number of locations where a light beam BL passes through an optical element that does not correspond to the light beam BL is 6 in the reduction system 6 as a whole, whereas in the present embodiment, the number of locations where a light beam BL passes through an optical element that does not correspond to the light beam BL is 4, which is the minimum, in the reduction system 16 as a whole.

The reduction system 16, which is formed of the first reduction system 17 and the second reduction system 18, each of which satisfies the second condition, also satisfies the third condition. In the reduction system 16, which satisfies the second and third conditions, the number of locations where a light beam BL passes through an optical element that does not correspond to the light beam BL is minimized in the reduction system 16 as a whole, whereby the light outputted from the light source unit 121 can be used more efficiently than in the first embodiment.

Third Embodiment

A light source apparatus according to a third embodiment of the invention will be subsequently described. The present embodiment differs from the second embodiment described above in terms of the structure of the reduction system, and the other configurations are the same in the two configurations. Therefore, in the following description, the same configurations and members as those in the second embodiment have the same reference characters and will not be described in detail.

Figure 8:
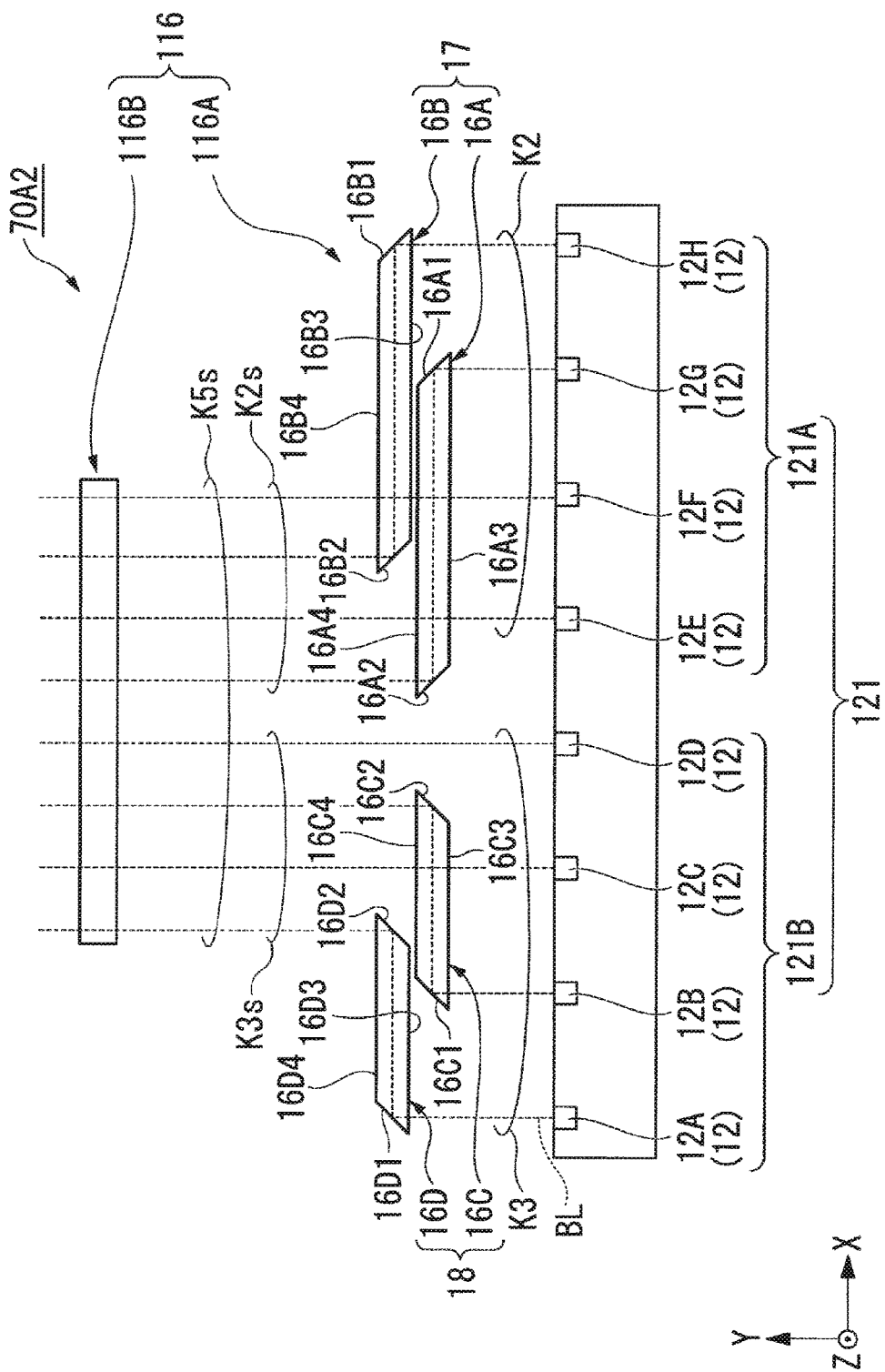
FIG. 8 is a top view showing the configuration of a light source apparatus according to a third embodiment.
Figure 9:
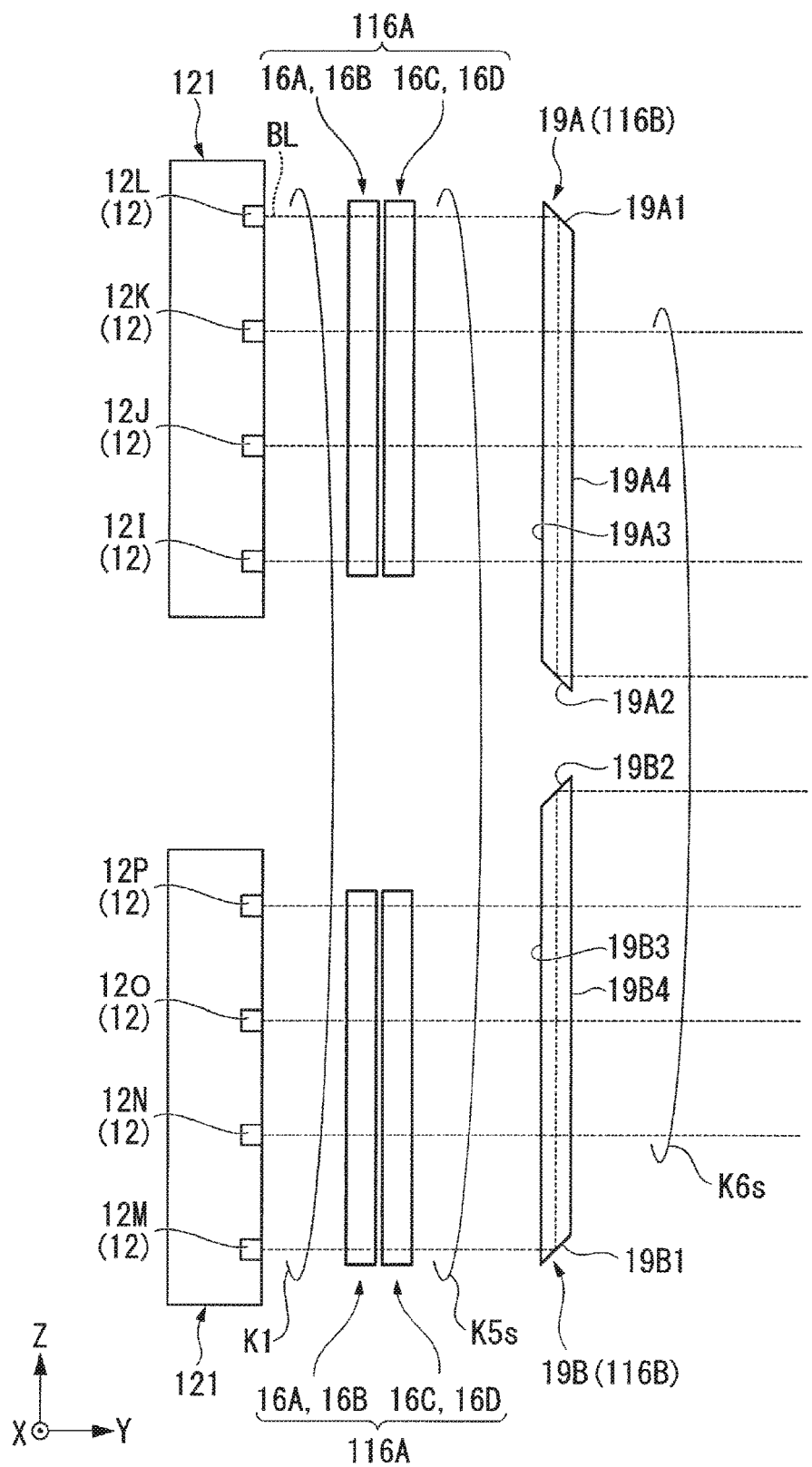
FIG. 9 is a side view showing the configuration of the light source apparatus according to the third embodiment.

FIG. 8 is a top view showing the configuration of a light source apparatus 70A2 according to the present embodiment. FIG. 9 is a side view showing the configuration of the light source apparatus 70A2.

The light source apparatus 70A2 according to the present embodiment includes two light source units 121 and a reduction system 116, as shown in FIGS. 8 and 9. The two light source units 121 are arranged in the Z direction.

The reduction system 116 in the present embodiment includes two front-stage reduction systems 116A and one rear-stage reduction system (third reduction system) 116B. The front-stage reduction systems 116A each have the same configuration as that of the reduction system 16 in the second embodiment and include the first reduction system 17 and the second reduction system 18. In the present embodiment, the two front-stage reduction systems 116A are arranged in the Z direction. The two front-stage reduction systems 116A correspond to the respective light source units 121.

The rear-stage reduction system 116B reduces the reduced light beam flux K5s having exited out of the front-stage reduction systems 116A in the Z direction (fourth direction perpendicular to first and second directions). The rear-stage reduction system 116B is disposed on the light exiting side (+Y side) of the front-stage reduction systems 116A.

That is, the reduction system 116 in the present embodiment can reduce the light beam width of the light beam flux K1 outputted from each of the light source units 121 both in the X and Z directions. Further, when viewed in the direction parallel to the traveling direction of the light beam fluxes K2 and K3 that enter the reduction system 116 (Y direction), the light source apparatus 70A2 is compact as compared with the light source apparatus in the related art described above. An illuminator including the reduction system 116 and a projector including the illuminator can therefore be readily reduced in size.

The rear-stage reduction system 116B includes a pair of prisms (optical elements) 19A and 19B arranged in the Z direction, as shown in FIG. 9. In the present embodiment, at least one of the prisms 19A and 19B corresponds to the "fourth optical element" in the claims.

The prism 19A has a fifth surface 19A3, a sixth surface 19A4, a fifth reflection surface 19A1, and a sixth reflection surface 19A2. The prism 19B has a fifth surface 19B3, a sixth surface 19B4, a fifth reflection surface 19B1, and a sixth reflection surface 19B2. The prisms 19A and 19B have the same configuration as that of the first prism 6A in the first embodiment and will not therefore be described in detail.

The parallelism between the fifth reflection surface 19A1 and the sixth reflection surface 19A2 of the prism 19A depends on the processing precision in the manufacture of the prism. The same holds true for the prism 19B. The rear-stage reduction system 116B including the prisms 19A and 19B therefore does not need to be implemented with high precision. The optical axis of the light that enters the rear-stage reduction system 116B is therefore readily allowed to be parallel to the optical axis of the light that exits out of the rear-stage reduction system 116B. The rear-stage reduction system 116B therefore reduces the reduced light beam flux K5s having exited out of the front-stage reduction systems 116A, as will be described later, and allows a reduced light beam flux K6s formed of the plurality of light beams BL parallel to one another to exit in a direction roughly the same as the traveling direction of the reduced light beam flux K5s.

On each of the prisms 19A and 19B is incident the light beam BL emitted from the corresponding laser out of the plurality of semiconductor lasers 12. In the following sections, the plurality of semiconductor lasers 12 arranged from the −Z side toward the +Z side in the upper-side light source unit 121 in FIG. 9 are sequentially referred to as semiconductor lasers 12I, 12J, 12K, and 12L for ease of description. The plurality of semiconductor lasers 12 arranged from the −Z side toward the +Z side in the lower-side light source unit 121 in FIG. 9 are sequentially referred to as semiconductor lasers 12M, 12N, 12O, and 12P.

The light beams BL emitted from the semiconductor lasers 12I, 12J, and 12K are shifted, for example, in the −X direction by the corresponding front-stage reduction system 116A, are then incident on the fifth surface 19A3 of the prism 19A, pass through the prism, and exit through the sixth surface 19A4. That is, the light beams BL from the semiconductor lasers 12I, 12J, and 12K pass through the prism 19A.

The light beams BL emitted from the semiconductor lasers 12N, 12O, and 12P are shifted, for example, in the −X direction by the corresponding front-stage reduction system 116A, are then incident on the fifth surface 19B3 of the prism 19B, pass through the prism, and exit through the sixth surface 19B4. That is, the light beams BL from the semiconductor lasers 12N, 12O, and 12P pass through the prism 19B.

On the other hand, the prism 19A is disposed in correspondence with the semiconductor laser 12L, and the prism 19B is disposed in correspondence with the semiconductor laser 12M in FIG. 9.

Figure 10B:
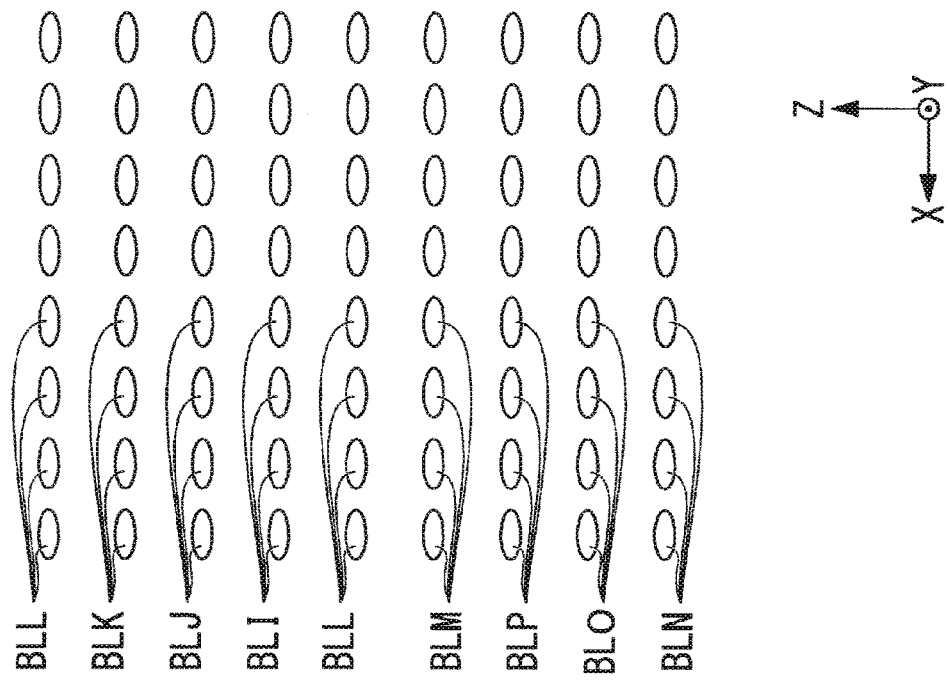
FIGS. 10(a) and 10(b) show reduction of a light beam flux achieved by a reduction system in the third embodiment.
Figure 10A:
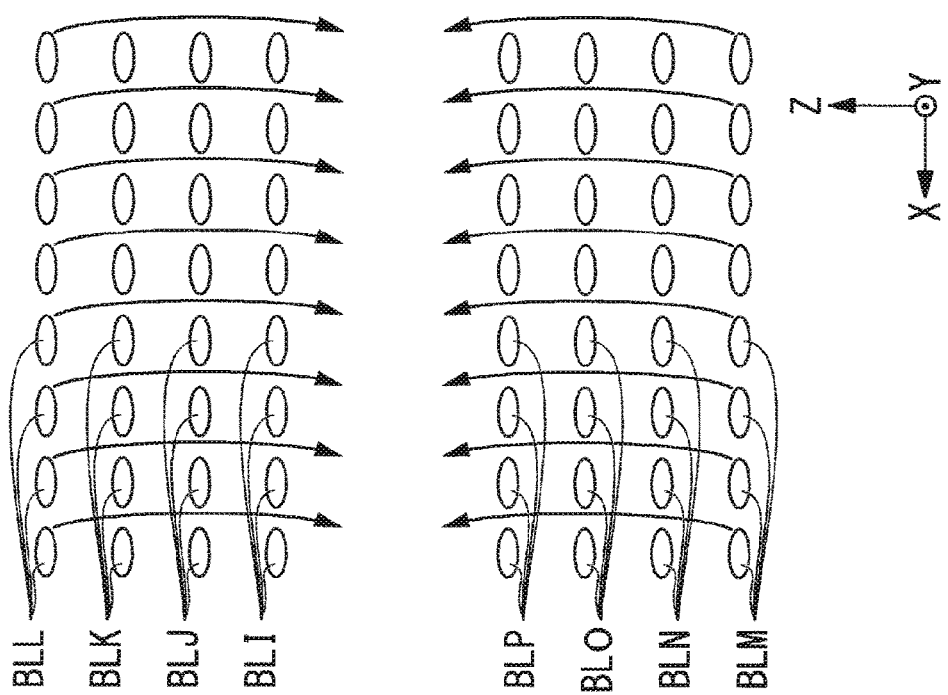
Figure 11A:
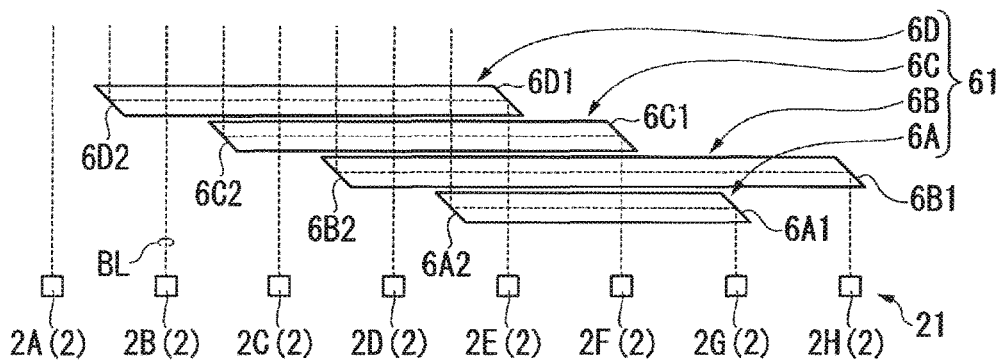
FIGS. 11(a) to 11(d) show the configurations of reduction systems according to variations.
Figure 11B:
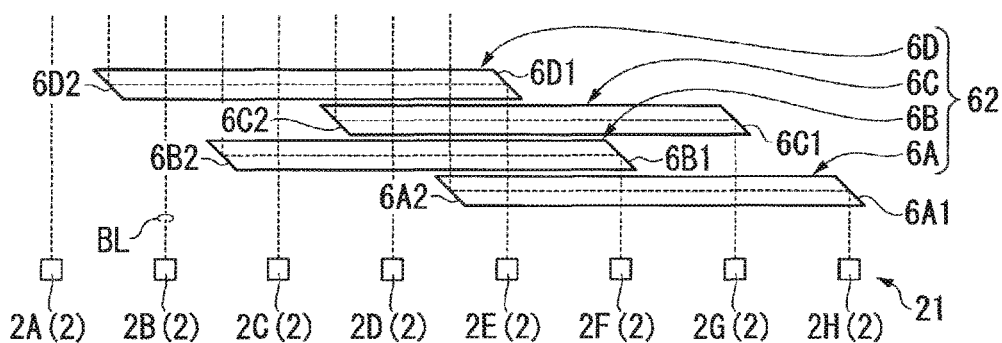
Figure 11C:
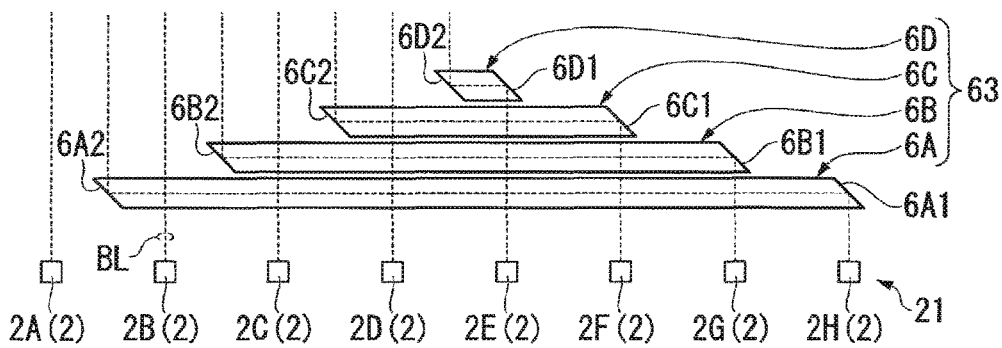
Figure 11D:
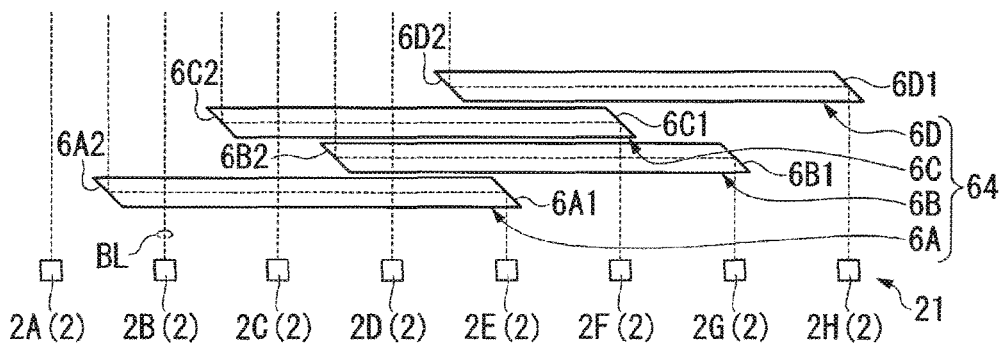
Figure 12A:
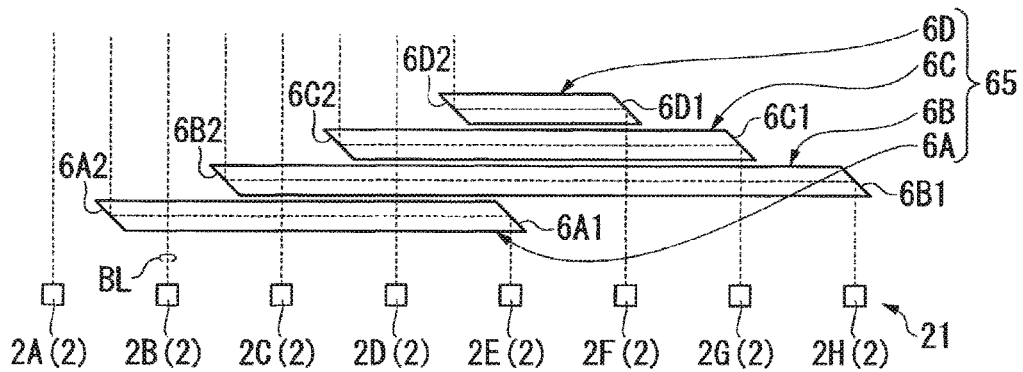
FIGS. 12(a) to 12(d) show the configurations of reduction systems according to variations.
Figure 12B:
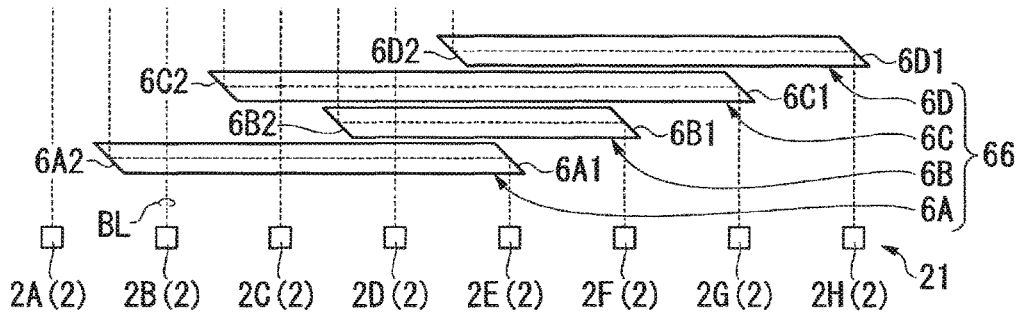
Figure 12C:
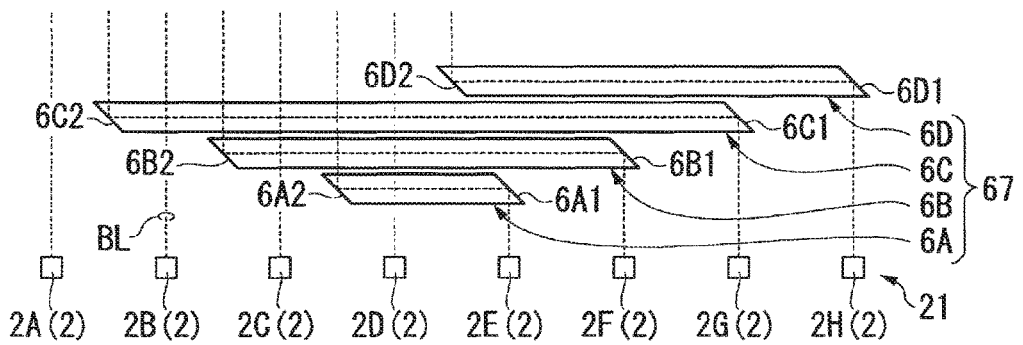
Figure 12D:
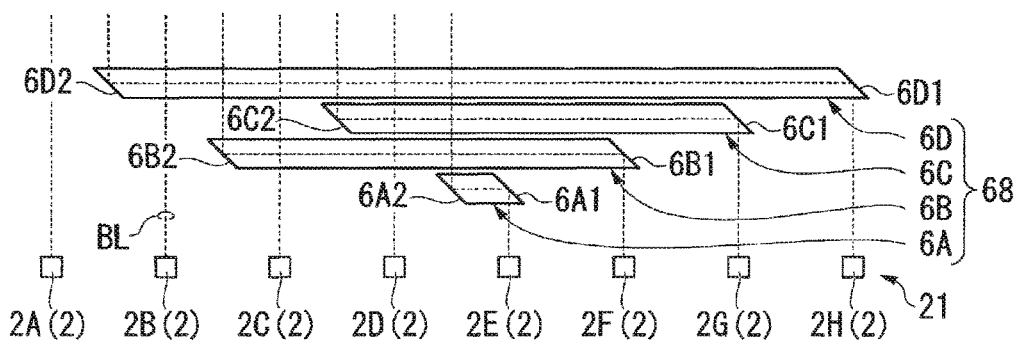

FIGS. 10(a) and 10(b) show reduction of the light beam flux achieved by the rear-stage reduction system 116B. FIG. 10 (a) shows the reduced light beam flux K5s before reduced by the rear-stage reduction system 116B, and FIG. 10 (b) shows the reduced light beam flux K6s after reduced by the rear-stage reduction system 116B.

The light beam BLL emitted from the semiconductor laser 12L passes through the fifth surface 19A3 of the prism 19A, is incident on the fifth reflection surface 19A1, is reflected off the fifth reflection surface 19A1 and the sixth reflection surface 19A2 in this order, passes through the sixth surface 19A4, and exits out of the prism 19A. As a result, the optical path of the light beam BLL are shifted by the prism 19A in the −Z direction, as shown in FIG. 10(a). The light beam BLL is located in the vicinity of the −Z side of the light beam BLI, as shown in FIG. 10(b).

The light beam BL emitted from the semiconductor laser 12M passes through the fifth surface 19B3 of the prism 19B, is incident on the fifth reflection surface 19B1, is reflected off the fifth reflection surface 19B1 and the sixth reflection surface 19B2 in this order, passes through the sixth surface 19B4, and exits out of the prism 19B. As a result, the optical path of the light beam BLM is shifted by the prism 19B in the +Z direction, as shown in FIG. 10(a). The light beam BLM is located in the vicinity of the +Z side of the light beam BLP, as shown in FIG. 10(b).

As described above, the reduction system 116 converts the light beam flux K1 in the X and Z directions into the reduced light beam flux K6s. The traveling direction of the reduced light beam flux K6s is roughly the same as the traveling direction of the light beam flux K1 when it enters the reduction system 116.

The light beam emitted from each of the semiconductor laser 12 has an elliptical cross-sectional shape (see FIGS. 10 (a) and 10 (b)). That is, in the reduction system 116 in the present embodiment, the front-stage reduction systems 116A, which reduce light beams in the major axis direction of the ellipse (X direction), are disposed in a position closer to the light source units 121 than the rear-stage reduction system 116B.

The greater the distance from the light source units 121, the greater the amount of shift in the positions of the light beams due to variation in implementation of the semiconductor lasers 12. According to the present embodiment, in the case where the light beam flux outputted from each of the light source units 121 is reduced in two directions, since the light beams BL are reduced first in the major axis direction along which the light beams BL are greatly affected by the positional shift, the optical paths of the light beams BL can be satisfactorily shifted but the shift in the positions of the light beams BL due to the implementation variation is suppressed.

The invention is not necessarily limited to the configurations in the embodiments described above, and a variety of changes can be made thereto to the extent that the changes do not depart from the substance of the invention.

In the first embodiment described above, the reduction system 6 satisfies the first and second conditions. Instead, the reduction system 6 only needs to satisfy at least the first condition.

A reduction system that satisfies the first condition will be described below with reference to FIGS. 11(*a*) to 11(*d*) and 12(*a*) to 12(*d*). In the examples shown in FIGS. 11(*a*) to 11(*d*) and 12 (*a*) to 12(*d*), the direction in which a light beam flux is reduced is the leftward direction in the figures. The examples differ from the first embodiment shown in FIG. 3 in terms only of the arrangement of the plurality of optical elements. In Comparative Example shown in FIG. 5, the number of locations where the light beams BL pass through the prisms is 18 in the reduction system 6' as a whole.

In a reduction system 61 shown in FIG. 11(*a*), since the first reflection surface 6B1 of the prism 6B is provided on the right of the first reflection surface 6A1 of the prism 6A, the reduction system 61 satisfies the first condition.

According to the reduction system 61, the number of locations where the light beams BL pass through the prism 6A is 2, the number of locations where the light beams BL pass through the prism 6B is 4, the number of locations where the light beams BL pass through the prism 6C is 5, and the number of locations where the light beams BL pass through the prism 6D is 6. That is, the number of locations where the light beams BL pass through the prisms in the reduction system 61 as a whole is 17, which is smaller than the number in Comparative Example 2.

In a reduction system 62 shown in FIG. 11(*b*), since the second reflection surface 6C2 of the prism 6C is provided on the right of the second reflection surface 6B2 of the prism 6B, the reduction system 62 satisfies the first condition. It can alternatively be said that the reduction system 62 satisfies the first condition because the first reflection surface 6C1 of the prism 6C is provided on the right of the first reflection surface 6B1 of the prism 6B. The number of locations where the light beams BL pass through the prisms in the reduction system 62 as a whole is 16, which is smaller than the number in the example shown in FIG. 11(*a*).

In a reduction system 63 shown in FIG. 11(*c*), since the second reflection surface 6D2 of the prism 6D is provided on the right of the second reflection surface 6C2 of the prism 6C, the reduction system 63 satisfies the first condition. It can alternatively be said that the reduction system 63 satisfies the first condition because the second reflection surface 6C2 of the prism 6C is provided on the right of the second reflection surface 6B2 of the prism 6B. It can still alternatively be said that the reduction system 63 satisfies the first condition because the second reflection surface 6B2 of the prism 6B is provided on the right of the second reflection surface 6A2 of the prism 6A. The number of locations where the light beams BL pass through the prisms in the reduction system 63 as a whole is 12.

In a reduction system 64 shown in FIG. 11(*d*), since the second reflection surface 6B2 of the prism 6B is provided on the right of the second reflection surface 6A2 of the prism 6A, the reduction system 64 satisfies the first condition. It can alternatively be said that the reduction system 64 satisfies the first condition because the first reflection surface 6D1 of the prism 6D is provided on the right of the first reflection surface 6C1 of the prism 6C. The number of locations where the light beams BL pass through the prisms in the reduction system 64 as a whole is 8.

In a reduction system 65 shown in FIG. 12(*a*), since the second reflection surface 6D2 of the prism 6D is provided on the right of the second reflection surface 6C2 of the prism 6C, the reduction system 65 satisfies the first condition. It can alternatively be said that the reduction system 65 satisfies the first condition because the first reflection surface 6B1 of the prism 6B is provided on the right of the first reflection surface 6A1 of the prism 6A. The number of locations where the light beams BL pass through the prisms in the reduction system 65 as a whole is 9.

In a reduction system 66 shown in FIG. 12 (*b*), since the second reflection surface 6D2 of the prism 6D is provided on the right of the second reflection surface 6C2 of the prism 6C, the reduction system 66 satisfies the first condition. It can alternatively be said that the reduction system 66 satisfies the first condition because the first reflection surface 6C1 of the prism 6C is provided on the right of the first reflection surface 6B1 of the prism 6B. The number of locations where the light beams BL pass through the prisms in the reduction system 66 as a whole is 7.

In a reduction system 67 shown in FIG. 12 (*c*), since the second reflection surface 6D2 of the prism 6D is provided on the right of the second reflection surface 6C2 of the prism 6C, the reduction system 67 satisfies the first condition. It can alternatively be said that the reduction system 67 satisfies the first condition because the first reflection surface 6C1 of the prism 6C is provided on the right of the first reflection surface 6B1 of the prism 6B. The number of locations where the light beams BL pass through the prisms in the reduction system 67 as a whole is 9.

In a reduction system 68 shown in FIG. 12(*d*), since the second reflection surface 6C2 of the prism 6C is provided on the right of the second reflection surface 6B2 of the prism 6B, the reduction system 68 satisfies the first condition. It can alternatively be said that the reduction system 68 satisfies the first condition because the first reflection surface 6C1 of the prism 6C is provided on the right of the first reflection surface 6B1 of the prism 6B. The number of locations where the light beams BL pass through the prisms in the reduction system 68 as a whole is 11.

As described above, since when the first condition is satisfied, the number of locations where the light beams pass through prisms in a reduction system as a whole can be smaller than the number in Comparative Example, whereby a decrease in the amount of light beam flux outputted from the light source unit 21 can be suppressed.

The above embodiments have been described with reference to the case where the phosphor layer 47 is provided on the rotating plate 49. The phosphor layer 47 may instead be provided on a substrate that does not rotate. Further, the rotating diffusion element 42 may be replaced with a configuration in which a diffusion element is provided on a substrate that does not rotate.

In the embodiments described above, the projector 1 including the three light modulator 4R, 4G, and 4B is presented by way of example. Instead, the invention is also applicable to a projector that uses a single light modulator to display color video images (still images).

In addition to the above, the shape, the number, the arrangement, the material, and other factors of the variety of components of the illuminator and the projector are not limited to those in the embodiments described above and can be changed as appropriate.

Further, the above embodiments have been each described with reference to the case where the illuminator according to the embodiment of the invention is incorporated in a projector, but not necessarily, and the illuminator according to the embodiment of the invention may be used as a lighting apparatus, a headlight of an automobile, and other components.

The entire disclosure of Japanese Patent Application No. 2015-067099, filed on Mar. 27, 2015 is expressly incorporated by reference herein.

REFERENCE SIGNS LIST

1: Projector, 4R, 4G, 4B: Light modulator, 5: Light combining system, 6, 16, 116: Reduction system, 6A1, 6B1, 6C1, 6D1: First reflection surface, 6A2, 6B2, 6C2, 6D2: Second reflection surface, 6A3, 6B3, 6C3, 6D3: First surface, 6A4, 6B4, 6C4, 6D4: Second surface, 6A, 6B, 6C, 6D: Prism (optical element), 16A, 16B, 16C, 16D: Prism (optical element), 16A1, 16B1: First reflection surface, 16A2, 16B2: Second reflect ion surface, 16C1, 16D1: Third reflection surface, 16C2, 16D2: Fourth reflection surface, 16A3, 16B3: First surface, 16A4, 16B4: Second surface, 16C3, 16D3: Third surface, 16C4, 16D4: Fourth surface, 19A, 19B: Prism (optical element), 19A1, 19B1: Fifth reflection surface, 19A2, 19B2: Sixth reflection surface, 19A3, 19B3: Fifth surface, 19A4, 19B4: Sixth surface, 21, 121: Light source unit, 47: Phosphor layer, 60: Projection system, 70: Illuminator, BL: Light beam, K1, K2, K3: Light beam flux

The invention claimed is:

1. A light source apparatus comprising:
a light source unit that outputs a light beam flux formed of a plurality of light beams; and
a reduction system that includes P optical elements including a first optical element and a second optical element and reduces a cross section of the light beam flux, the cross section being defined by a first direction and a third direction perpendicular to the first direction, wherein
the P optical elements each have
a first surface having optical transparency,
a second surface that faces the first surface and has optical transparency,
a first reflection surface that is provided at a first end and inclines with respect to a normal to the first surface, and
a second reflection surface that is provided at a second end that faces the first end and inclines with respect to a normal to the second surface,
the P optical elements each allow a corresponding light beam of the light beam flux to pass through the first surface, to be incident on the first reflection surface, to be sequentially reflected off the first reflection surface and the second reflection surface, and to further exit through the second surface to shift an optical path of the light beam in the first direction,
the light beam flux enters the reduction system along a second direction that intersects the first direction and the third direction,
the first optical element and the second optical element are sequentially provided in the second direction,
the first reflection surface of the second optical element is shifted from the first reflection surface of the first optical element in a direction opposite the first direction, and
the second reflection surface of the second optical element is shifted from the second reflection surface of the first optical element in the direction opposite the first direction.

2. The light source apparatus according to claim 1, wherein
the P optical elements are sequentially provided in the second direction, and
when R is an arbitrary integer greater than or equal to 2 but smaller than or equal to P, the first reflection surface of an R-th of the optical elements is shifted from the first reflection surface of an (R−1)-th of the optical elements in the direction opposite the first direction, and
the second reflection surface of the R-th optical element is shifted from the second reflection surface of the (R−1)-th optical element in the direction opposite the first direction.

3. The light source apparatus according to claim 2, further comprising:
a second light source unit that outputs a second light beam flux formed of a plurality of light beams, and
a second reduction system that includes Q third optical elements and reduces a cross section of the second light beam flux in a third direction opposite the first direction,
wherein the Q third optical elements each have
a third surface having optical transparency,
a fourth surface that faces the third surface and has optical transparency,
a third reflection surface that is provided at a third end and inclines with respect to a normal to the third surface, and
a fourth reflection surface that is provided at a fourth end that faces the third end and inclines with respect to a normal to the fourth surface,
the Q third optical elements each allow a corresponding light beam of the second light beam flux to pass through the third surface, to be incident on the third reflection surface, to be sequentially reflected off the third reflection surface and the fourth reflection surface, and to further exit through the fourth surface to shift an optical path of the light beam in the third direction,
the second light beam flux enters the second reduction system along the second direction,
the Q third optical elements are sequentially provided in the second direction,
when S is an arbitrary integer greater than or equal to 2 but smaller than or equal to Q, the third reflection surface of an S-th of the third optical elements is shifted from the third reflection surface of an (S−1)-th of the third optical elements in the first direction, and
the fourth reflection surface of the S-th third optical element is shifted from the fourth reflection surface of the (S−1)-th third optical element in the first direction.

4. The light source apparatus according to claim 3, wherein
the light source apparatus further comprises a third reduction system that further includes a fourth optical element and reduces the cross section of the light beam flux in a fourth direction that intersects the first direction but differs from the second direction,
the fourth optical element has
a fifth surface having optical transparency,
a sixth surface that faces the fifth surface and has optical transparency,
a fifth reflection surface that is provided at a first end and inclines with respect to a normal to the fifth surface, and
a sixth reflection surface that is provided at a second end that faces the first end and inclines with respect to a normal to the sixth surface,
the fourth optical element allows a corresponding light beam of the light beam flux to pass through the fifth surface, to be incident on the fifth reflection surface, to be sequentially reflected off the fifth reflection surface and the sixth reflection surface, and to further exit through the sixth surface to shift an optical path of the light beam in the fourth direction, the first direction coincides with a direction of a major axis of a cross section of the light beam, and the third reduction system is disposed in a position downstream of the reduction system.

5. An illuminator comprising the light source apparatus according to claim 3.

6. A projector comprising:
the illuminator according to claim 5;
a light modulator that modulates light outputted from the illuminator in accordance with image information to form image light; and
a projection system that projects the image light.

7. The light source apparatus according to claim 2, wherein
the light source apparatus further comprises a third reduction system that further includes a fourth optical element and reduces the cross section of the light beam flux in a fourth direction that intersects the first direction but differs from the second direction,
the fourth optical element has
a fifth surface having optical transparency,
a sixth surface that faces the fifth surface and has optical transparency,
a fifth reflection surface that is provided at a first end and inclines with respect to a normal to the fifth surface, and
a sixth reflection surface that is provided at a second end that faces the first end and inclines with respect to a normal to the sixth surface,
the fourth optical element allows a corresponding light beam of the light beam flux to pass through the fifth surface, to be incident on the fifth reflection surface, to be sequentially reflected off the fifth reflection surface and the sixth reflection surface, and to further exit through the sixth surface to shift an optical path of the light beam in the fourth direction,
the first direction coincides with a direction of a major axis of a cross section of the light beam, and the third reduction system is disposed in a position downstream of the reduction system.

8. An illuminator comprising the light source apparatus according to claim 2.

9. A projector comprising:
the illuminator according to claim 8;
a light modulator that modulates light outputted from the illuminator in accordance with image information to form image light; and
a projection system that projects the image light.

10. The light source apparatus according to claim 1, wherein
at least one of the first optical element and the second optical element is formed of a prism.

11. An illuminator comprising the light source apparatus according to claim 10.

12. A projector comprising:
the illuminator according to claim 11;
a light modulator that modulates light outputted from the illuminator in accordance with image information to form image light; and
a projection system that projects the image light.

13. The light source apparatus according to claim 1, wherein the light source apparatus further comprises a third reduction system that further includes a fourth optical element and reduces the cross section of the light beam flux in a fourth direction that intersects the first direction but differs from the second direction,
the fourth optical element has
a fifth surface having optical transparency,
a sixth surface that faces the fifth surface and has optical transparency,
a fifth reflection surface that is provided at a first end and inclines with respect to a normal to the fifth surface, and
a sixth reflection surface that is provided at a second end that faces the first end and inclines with respect to a normal to the sixth surface,
the fourth optical element allows a corresponding light beam of the light beam flux to pass through the fifth surface, to be incident on the fifth reflection surface, to be sequentially reflected off the fifth reflection surface and the sixth reflection surface, and to further exit through the sixth surface to shift an optical path of the light beam in the fourth direction,
the first direction coincides with a direction of a major axis of a cross section of the light beam, and the third reduction system is disposed in a position downstream of the reduction system.

14. An illuminator comprising the light source apparatus according to claim 13.

15. A projector comprising:
the illuminator according to claim 14;
a light modulator that modulates light outputted from the illuminator in accordance with image information to form image light; and
a projection system that projects the image light.

16. The light source apparatus according to claim 1, wherein
the first reflection surface inclines by 45° with respect to a normal to the first surface, and
the second reflection surface is so disposed as to be parallel to the first reflection surface.

17. An illuminator comprising the light source apparatus according to claim 16.

18. A projector comprising:
the illuminator according to claim 17;
a light modulator that modulates light outputted from the illuminator in accordance with image information to form image light; and
a projection system that projects the image light.

19. An illuminator comprising the light source apparatus according to claim 1.

20. A projector comprising:
the illuminator according to claim 19;
a light modulator that modulates light outputted from the illuminator in accordance with image information to form image light; and
a projection system that projects the image light.

21. The light source apparatus according to claim 1, wherein
the reduction system reduces the cross section of the light beam flux in the first direction.

22. A light source apparatus comprising:
a light source unit that outputs a light beam flux formed of a plurality of light beams; and
a reduction system that includes P optical elements including a first optical element and a second optical element and reduces a cross section of the light beam flux, the cross section being defined by first direction and a third direction perpendicular to the first direction, wherein the P optical elements each have
- a first surface having optical transparency,
- a second surface that faces the first surface and has optical transparency,
- a first reflection surface that is provided at a first end and inclines with respect to a normal to the first surface, and
- a second reflection surface that is provided at a second end that faces the first end and inclines with respect to a normal to the second surface, the P optical elements each allow a corresponding light beam of the light beam flux to pass through the first surface, to be incident on the first reflection surface, to be sequentially reflected off the first reflection surface and the second reflection surface, and to further exit through the second surface to shift an optical path of the light beam in the first direction, the light beam flux enters the reduction system along a second direction that intersects the first direction and the third direction, the light beam flux continues to travel in the second direction after passing through the reduction system with the reduced cross section, the first optical element and the second optical element are sequentially provided in the second direction, and (1) the first reflection surface of the second optical element is shifted from the first reflection surface of the first optical element in a direction opposite the first direction, or (2) the second reflection surface of the second optical element is shifted from the second reflection surface of the first optical element in the direction opposite the first direction.

23. The light source apparatus according to claim 22, wherein the reduction system reduces the cross section of the light beam flux in the first direction.

* * * * *